United States Patent
Veto

(10) Patent No.: US 10,934,013 B2
(45) Date of Patent: Mar. 2, 2021

(54) AIRCRAFT FUSELAGE APPARATUS HAVING EMBEDDED STRUCTURAL BATTERIES

(71) Applicant: The Boeing Company, Chicago, IL (US)

(72) Inventor: Christopher C. Veto, Hawthorne, CA (US)

(73) Assignee: THE BOEING COMPANY, Chicago, IL (US)

( * ) Notice: Subject to any disclaimer, the term of this patent is extended or adjusted under 35 U.S.C. 154(b) by 736 days.

(21) Appl. No.: 15/712,618

(22) Filed: Sep. 22, 2017

(65) Prior Publication Data

US 2019/0092488 A1 Mar. 28, 2019

(51) Int. Cl.
| | |
|---|---|
| *B64D 41/00* | (2006.01) |
| *H01M 2/10* | (2006.01) |
| *B64C 1/00* | (2006.01) |
| *B64D 27/24* | (2006.01) |
| *H01M 2/02* | (2006.01) |
| *H01M 2/30* | (2006.01) |
| *B64C 1/12* | (2006.01) |
| *B64C 3/26* | (2006.01) |

(52) U.S. Cl.
CPC ............... *B64D 41/00* (2013.01); *B64C 1/00* (2013.01); *B64C 1/12* (2013.01); *B64C 3/26* (2013.01); *B64D 27/24* (2013.01); *H01M 2/0257* (2013.01); *H01M 2/0285* (2013.01); *H01M 2/0295* (2013.01); *H01M 2/10* (2013.01); *H01M 2/30* (2013.01); *B64C 2001/0072* (2013.01); *B64D 2041/002* (2013.01); *H01M 2220/20* (2013.01)

(58) Field of Classification Search
CPC ... B64D 41/00; B64D 27/24; B64D 2041/002
See application file for complete search history.

(56) References Cited

U.S. PATENT DOCUMENTS

| | | | |
|---|---|---|---|
| 8,967,529 B1 | 3/2015 | Bennett | |
| 9,309,006 B2 * | 4/2016 | Zwaan | B64C 39/024 |
| 9,520,580 B2 * | 12/2016 | Sayre | H01M 2/027 |
| 9,663,233 B2 | 5/2017 | Plessner et al. | |
| 9,850,004 B2 * | 12/2017 | Zwaan | B64C 39/024 |
| 10,189,581 B2 * | 1/2019 | Zwaan | B64D 47/08 |
| 10,457,418 B2 * | 10/2019 | Zwaan | B64D 9/00 |

(Continued)

FOREIGN PATENT DOCUMENTS

| | | | |
|---|---|---|---|
| EP | 2852990 | 4/2015 | |
| EP | 3326917 A1 * | 5/2018 | ........... B64C 31/024 |
| WO | 2014021970 | 2/2014 | |

OTHER PUBLICATIONS

European Patent Office, "Extended European Search Report," issued in connection with European Patent Application No. 18180186.1, dated Oct. 24, 2018, 10 pages.

*Primary Examiner* — Philip J Bonzell
(74) *Attorney, Agent, or Firm* — Hanley, Flight & Zimmerman, LLC

(57) ABSTRACT

Aircraft fuselage apparatus having embedded structural batteries are disclosed. An example apparatus includes a fuselage having a wall. The wall has an outer surface, an inner surface, and a structural battery embedded in the wall between the outer surface and the inner surface.

20 Claims, 14 Drawing Sheets

(56) References Cited

U.S. PATENT DOCUMENTS

| | | | |
|---|---|---|---|
| 2004/0211862 A1* | 10/2004 | Elam | B64D 27/24 |
| | | | 244/58 |
| 2013/0193269 A1* | 8/2013 | Zwaan | B64C 39/024 |
| | | | 244/118.1 |
| 2015/0093629 A1* | 4/2015 | Sayre | H01M 2/168 |
| | | | 429/156 |
| 2016/0251087 A1* | 9/2016 | Zwaan | B64D 9/00 |
| | | | 244/118.1 |
| 2017/0050533 A1 | 2/2017 | Wei et al. | |
| 2017/0152014 A1* | 6/2017 | Gould | B64C 39/024 |
| 2017/0271711 A1 | 9/2017 | Benthien et al. | |
| 2018/0086480 A1* | 3/2018 | Zwaan | B64D 9/00 |
| 2019/0118971 A1* | 4/2019 | Zwaan | B64D 47/08 |
| 2019/0252655 A1* | 8/2019 | Zimmermann | H01M 2/1077 |
| 2019/0263498 A1* | 8/2019 | Bernasconi | B64D 35/08 |
| 2019/0296300 A1* | 9/2019 | Zimmermann | B60L 50/66 |
| 2019/0341592 A1* | 11/2019 | Linde | B64C 31/024 |
| 2020/0062418 A1* | 2/2020 | Zwaan | B64D 9/00 |
| 2020/0168962 A1* | 5/2020 | Schlunke | H01M 2/1016 |

* cited by examiner

US 10,934,013 B2

AIRCRAFT FUSELAGE APPARATUS HAVING EMBEDDED STRUCTURAL BATTERIES

FIELD OF THE DISCLOSURE

This disclosure relates generally to aircraft fuselage apparatus and, more particularly, to aircraft fuselage apparatus having embedded structural batteries.

BACKGROUND

Structural batteries are multifunctional devices that carry mechanical loads while also storing electrical energy. Structural batteries may be fabricated from sheets and/or plies of carbon fiber and/or carbon composite material that are separated by voltaic piles and/or laced with lithium ions. Structural batteries may be formed to have complex three-dimensional shapes, including shapes that may be embedded and/or integrated into other complex three-dimensional structures of an object.

SUMMARY

Aircraft fuselage apparatus having embedded structural batteries are disclosed. In some disclosed examples, an apparatus comprises a fuselage including a wall. In some disclosed examples, the wall has an outer surface, an inner surface, and a structural battery embedded in the wall between the outer surface and the inner surface.

In some disclosed examples, an apparatus comprises a fuselage including a floor. In some disclosed examples, the floor has an upper surface, a lower surface, and a structural battery embedded in the floor between the upper surface and the lower surface.

In some disclosed examples, an apparatus comprises a fuselage including a wall. In some disclosed examples, the wall has an outer surface, an inner surface, and a battery embedded in the wall between the outer surface and the inner surface. In some disclosed examples, the battery includes a casing fabricated from carbon composite material. In some disclosed examples, the casing is to provide structural support to the wall.

Figure 1:
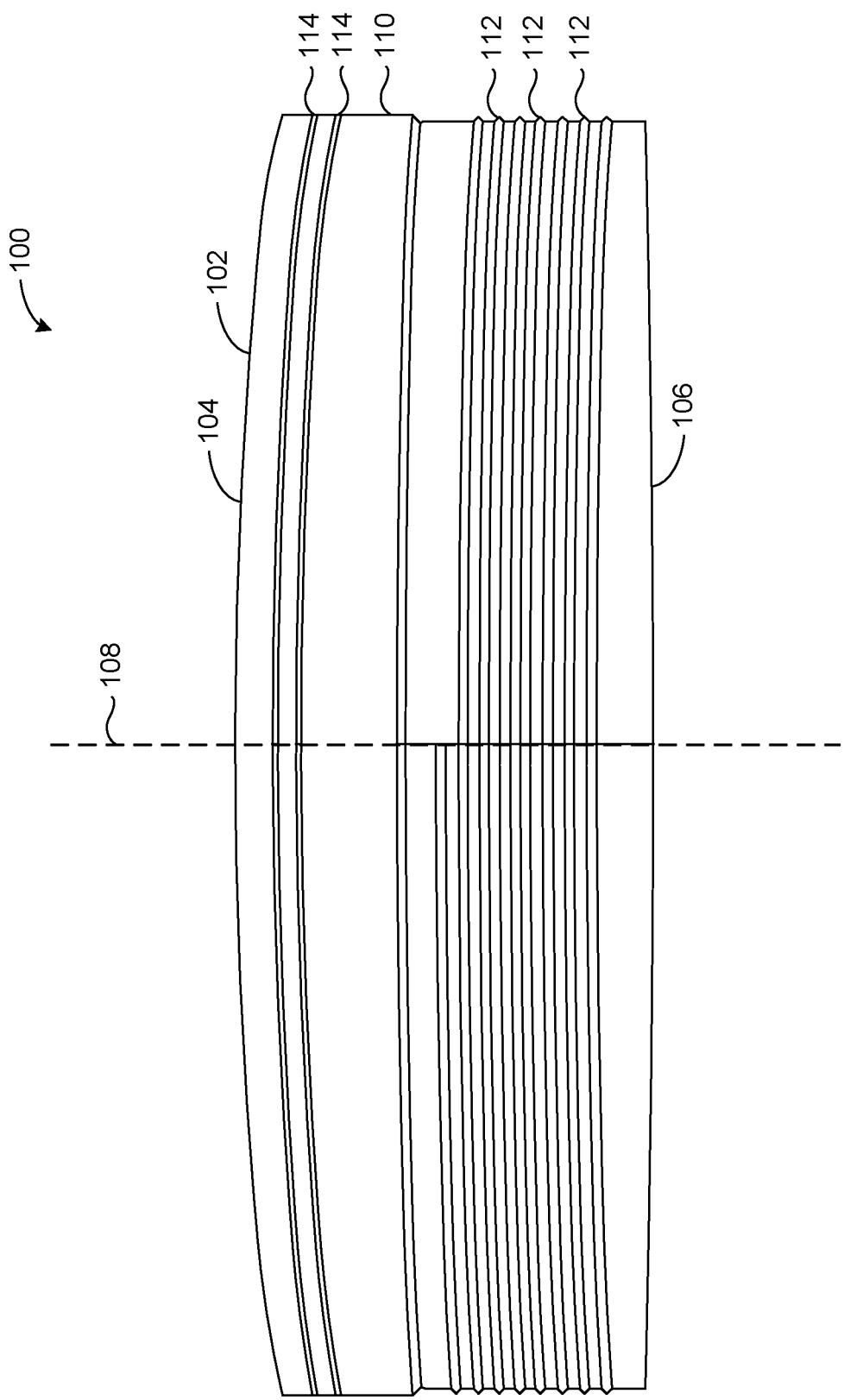
FIG. 1 is a side view of an example structural battery that may be embedded in a fuselage of an aircraft in accordance with the teachings of this disclosure.

Certain examples are shown in the above-identified figures and described in detail below. In describing these examples, like or identical reference numbers are used to identify the same or similar elements. The figures are not necessarily to scale and certain features and certain views of the figures may be shown exaggerated in scale or in schematic for clarity and/or conciseness.

DETAILED DESCRIPTION

Design considerations for aircraft fuselages are often limited and/or restricted by the weight and/or volume of batteries that may need to be housed in and/or on the aircraft to supply electrical energy to various electrically-powered devices of the aircraft. Additional design burdens arise from the need to develop and implement mechanisms capable of rapidly cooling such batteries in a cost-efficient manner during operation of the batteries and/or the aircraft.

As used herein, the term "structural battery" refers to a battery having a casing formed from a metal, which may or may not include Nitinol, Tungsten, Crystal, Tungsten Carbide, Austenite, Martensite, marble, diamond, cubic-Boron-Nitride, carbon fiber or carbon composite plied material, including Single-Wall-Carbon-Nano-Tube (SWCT) and/or Multi-Wall-Carbon-Nano-Tube (MWCNT), where the casing provides structural support, aero-elastic damping of resonant, vacillating modes, and/or aero-acoustic damping to an object within which the battery is embedded and/or integrated. As used herein, the term "embedded" means made to be an integral part of. The aircraft fuselage apparatus disclosed herein include structural batteries embedded in one or more walls of the fuselage (e.g., an outer wall of the fuselage, a floor of the fuselage, an overhead storage compartment wall of the fuselage, etc.). As a result of the structural batteries being embedded in the fuselage wall(s), the disclosed aircraft fuselage apparatus advantageously increase the weight efficiency and/or the volume efficiency associated with an aircraft. For example, by embedding the structural batteries in the fuselage wall(s), additional batteries that would otherwise be stored and/or housed at other locations in and/or on the aircraft may be eliminated and/or nixed from the aircraft.

In some examples, the disclosed aircraft fuselage apparatus also advantageously provide a mechanism for rapidly cooling the embedded structural batteries in a cost-efficient manner during operation of an aircraft. For example, one or more portions of the embedded structural batteries may be exposed to an ambient environment that is external to the aircraft, thereby enabling the embedded structural batteries to interface with cold air and/or an associated airflow that may be present in the ambient environment (e.g., during a flight of the aircraft), and/or for heat to be drawn from the embedded structural batteries via convective heat transfer.

In some examples, the embedded structural batteries disclosed herein may be integrally formed with one or more of the fuselage walls of the disclosed aircraft fuselage apparatus. In such examples, the embedded structural batteries and the fuselage implementing such embedded structural batteries may advantageously be concomitantly formed, fabricated and/or manufactured, thereby reducing (e.g., eliminating) any need to form, fabricate and/or manufacture other batteries for the aircraft separately from forming, fabricating and/or manufacturing the fuselage of the aircraft.

Figure 2:
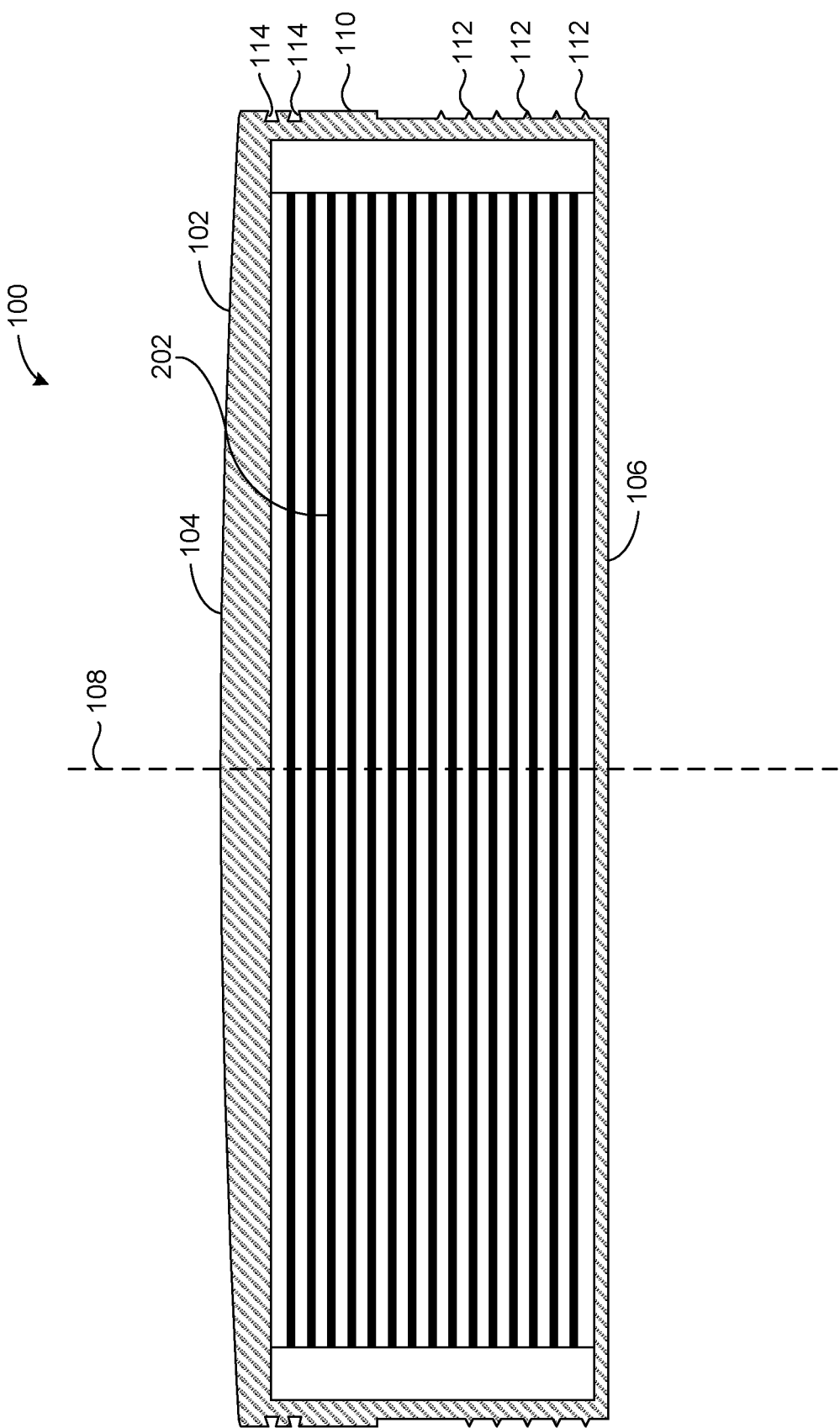
FIG. 2 is cross-sectional view of the example structural battery of FIG. 1.

FIG. 1 is a side view of an example structural battery 100 that may be embedded in a fuselage of an aircraft in accordance with the teachings of this disclosure. FIG. 2 is cross-sectional view of the example structural battery 100 of FIG. 1. The structural battery 100 of FIGS. 1 and 2 includes an example casing 102 having a first example structural surface 104 and a second example structural surface 106 located opposite the first structural surface 104. The first structural surface 104, the second structural surface 106, and/or, more generally, the casing 102 of the casing FIGS. 1 and 2 are configured to carry mechanical loads. In the illustrated example of FIGS. 1 and 2, the casing 102 of the structural battery 100 is fabricated from metallic material which may or may not be additively manufactured (e.g., metal powder melting). In other examples, the casing 102 may alternatively be fabricated from plastic, polycarbonate material, from any non-metallic material, and/or from any heterogeneous permutation of non-metallic and metallic material.

As shown in FIG. 2, the structural battery 100 further includes an example voltaic pile 202 positioned within the casing 102 between the first structural surface 104 and the second structural surface 106 of the structural battery 100. The voltaic pile 202 of FIG. 2 is configured to store electrical energy. In some examples, the casing 102 (e.g., including the first structural surface 104 and the second structural surface 106), the voltaic pile 202, and/or, more generally, the structural battery 100 of FIGS. 1 and 2 may be fabricated via an additive manufacturing (AM) process.

In the illustrated example of FIGS. 1 and 2, the casing 102 of the structural battery 100 has a cylindrical shape (e.g., a disk shape) defined by the first structural surface 104, the second structural surface 106, an example central axis 108, and an example peripheral surface 110 extending between the first structural surface 104 and the second structural surface 106. The first structural surface 104 and the second structural surface 106 of FIGS. 1 and 2 have circular profiles corresponding to the cylindrical shape of the casing 102 of the structural battery 100 of FIGS. 1 and 2. In other examples, the first structural surface 104 and/or the second structural surface 106 of FIGS. 1 and 2 may have curved, wavy, serrated, bossed and/or elliptical profiles corresponding to a cylindrical shape of the casing 102 of the structural battery 100 of FIGS. 1 and 2.

In some examples, the casing 102 of the structural battery 100 has a diameter (e.g., measured across the first structural surface 104 of FIGS. 1 and 2 through the central axis 108 of FIGS. 1 and 2) between 0.000001 and 300.0 inches, and a height (e.g., measured between the first structural surface 104 and the second structural surface 106 of FIGS. 1 and 2 along the central axis 108 of FIGS. 1 and 2) between 0.000001 and 300.0 inches. In the illustrated example of FIGS. 1 and 2, the casing 102 of the structural battery 100 has a diameter of approximately 7.0 inches and a height of approximately 2.0 inches. In some examples, the casing 102 may have a hand-held size. In some examples, the casing 102 may be sized to the nano-scale. In some examples, the casing 102 may have a weight of approximately one hundred pounds.

In some examples, the first structural surface 104 and/or the second structural surface 106 of the casing 102 of the structural battery 100 of FIGS. 1 and 2 may be flat and/or planar. In other examples, the first structural surface 104 and/or the second structural surface 106 of the casing 102 of the structural battery 100 of FIGS. 1 and 2 may have a curved and/or non-planar shape. For example, the first structural surface 104 and/or the second structural surface 106 of the casing 102 of the structural battery 100 of FIGS. 1 and 2 may have a concave shape and/or a convex shape configured to match and/or substantially align with the chosen shape and/or contour of a surrounding object into which the structural battery 100 of FIGS. 1 and 2 may be embedded.

In some examples, the casing 102 of the structural battery 100 of FIGS. 1 and 2 may have a shape, a diameter, and/or a height differing from the shapes, the diameters, and/or the heights described above. For example, the first structural surface 104 and/or the second structural surface 106 of the structural battery 100 of FIGS. 1 and 2 may have an alternate shape such as an elliptical shape, a triangular shape, a rectangular shape, a square shape, a pentagonal shape, a hexagonal shape, or any other polygonal shape. In such examples, the three-dimensional shape of the structural battery 100 may correspond to the two-dimensional shape of the first structural surface 104 and/or the second structural surface 106. As another example, the peripheral surface 110 of the structural battery 100 of FIGS. 1 and 2 may taper toward the central axis 108 of the structural battery 100 as the peripheral surface 110 advances from the first structural surface 104 toward the second structural surface 106 of FIGS. 1 and 2. In such examples, the second structural surface 106 of FIGS. 1 and 2 may have a diameter that is smaller than a diameter of the first structural surface 104 of FIGS. 1 and 2. As yet another example, the casing 102 of the structural battery 100 of FIGS. 1 and 2 may have a diameter and/or a height that is substantially greater than, and/or substantially less than, the range of diameters and/or the range of heights described above. In some examples, the sizing of the casing 102 of the structural battery 100 of FIGS. 1 and 2 may enable precise insertion sizing of loose fit, transition (e.g. jam) fit and/or clearance fit.

In the illustrated example of FIGS. 1 and 2, the casing 102 of the structural battery 100 further includes example threads 112 and example grooves 114 respectively located around the peripheral surface 110 of the casing 102 of the structural battery 100 between the first structural surface 104 and the second structural surface 106. The threads 112 of FIGS. 1 and 2 extend outwardly from the peripheral surface 110 of the casing 102 of the structural battery 100 and are configured to be received by and/or to mate with corresponding threads of an object (not shown) to removably couple the structural battery 100 of FIGS. 1 and 2 to the object. The grooves 114 of FIGS. 1 and 2 extend inwardly from the peripheral surface 110 of the casing 102 of structural battery 100 and are configured to receive and/or retain O-rings (not shown) capable of forming a seal between the structural battery 100 of FIGS. 1 and 2 and an object (not shown) to which the structural battery 100 is coupled. In some examples in which the structural battery 100 is manufactured via an AM process, the grooves 114 may initially be filled by breakaway support material (not shown). In such examples, the breakaway support material is fractal, and may accordingly be removed and/or disconnected from the structural battery 100 (e.g., when the AM process is complete), with the removal and/or disconnection of the breakaway support material resulting in the formed grooves 114 of FIGS. 1 and 2. In other examples, the threads 112 and/or the grooves 114 shown in the illustrated example of FIGS. 1 and 2 may be absent and/or omitted from the casing 102 of the structural battery 100.

Figure 3:
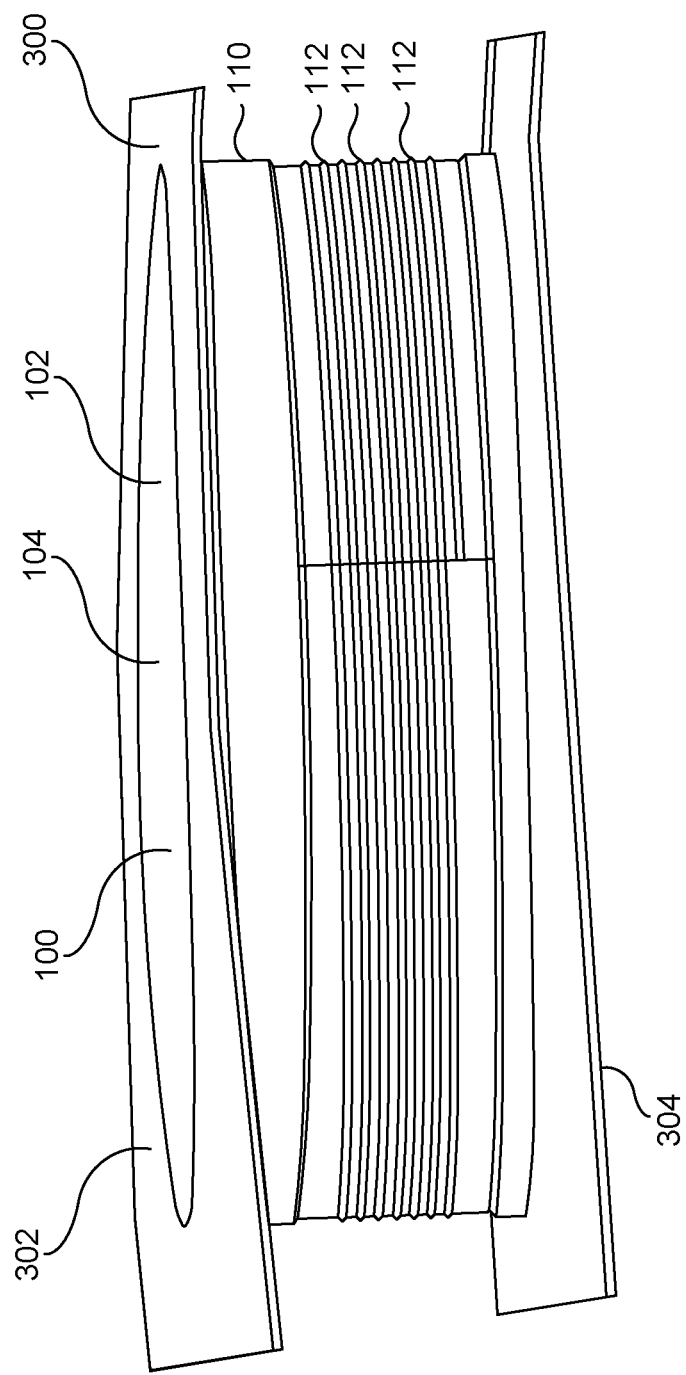
FIG. 3 is a perspective view of the example structural battery of FIGS. 1 and 2 embedded in an example wall.

FIG. 3 is a perspective view of the example structural battery 100 of FIGS. 1 and 2 embedded in an example wall 300. The wall 300 of FIG. 3 includes an example first structural surface 302 and an example second structural surface 304 located opposite the first structural surface 302. In the illustrated example of FIG. 3, the structural battery 100 is embedded in the wall 300 such that the first structural surface 104 of the structural battery 100 is substantially flush with the first structural surface 302 of the wall 300, and the second structural surface 106 of the structural battery 100 is substantially flush with the second structural surface 304 of the wall 300. In other examples, the first structural surface 104 and/or the second structural surface 106 of the structural battery 100 may instead be positioned within the bounds of the wall 300 defined by the first structural surface 302 and the second structural surface 304 of the wall 300, without the first structural surface 104 and/or the second structural surface 106 of the structural battery 100 being substantially flush with corresponding ones of the first structural surface 302 and/or the second structural surface 304 of the wall 300.

In some examples, the structural battery 100 of FIGS. 1-3 may be integrated into the wall 300 of FIG. 3 such that the structural battery 100 is permanently and/or non-removably coupled to and/or formed with the wall 300. In other examples, the structural battery 100 of FIGS. 1-3 may be embedded in the wall 300 of FIG. 3 such that the structural battery 100 is removably coupled to the wall 300. For example, the wall 300 may include receiving threads (not shown) located between the first structural surface 302 and the second structural surface 304 of the wall 300. The receiving threads of the wall 300 may be configured to evenly receive and/or to mate with the threads 112 of the structural battery 100 of FIGS. 1-3 to removably couple the structural battery 100 to the wall 300.

Figure 4:
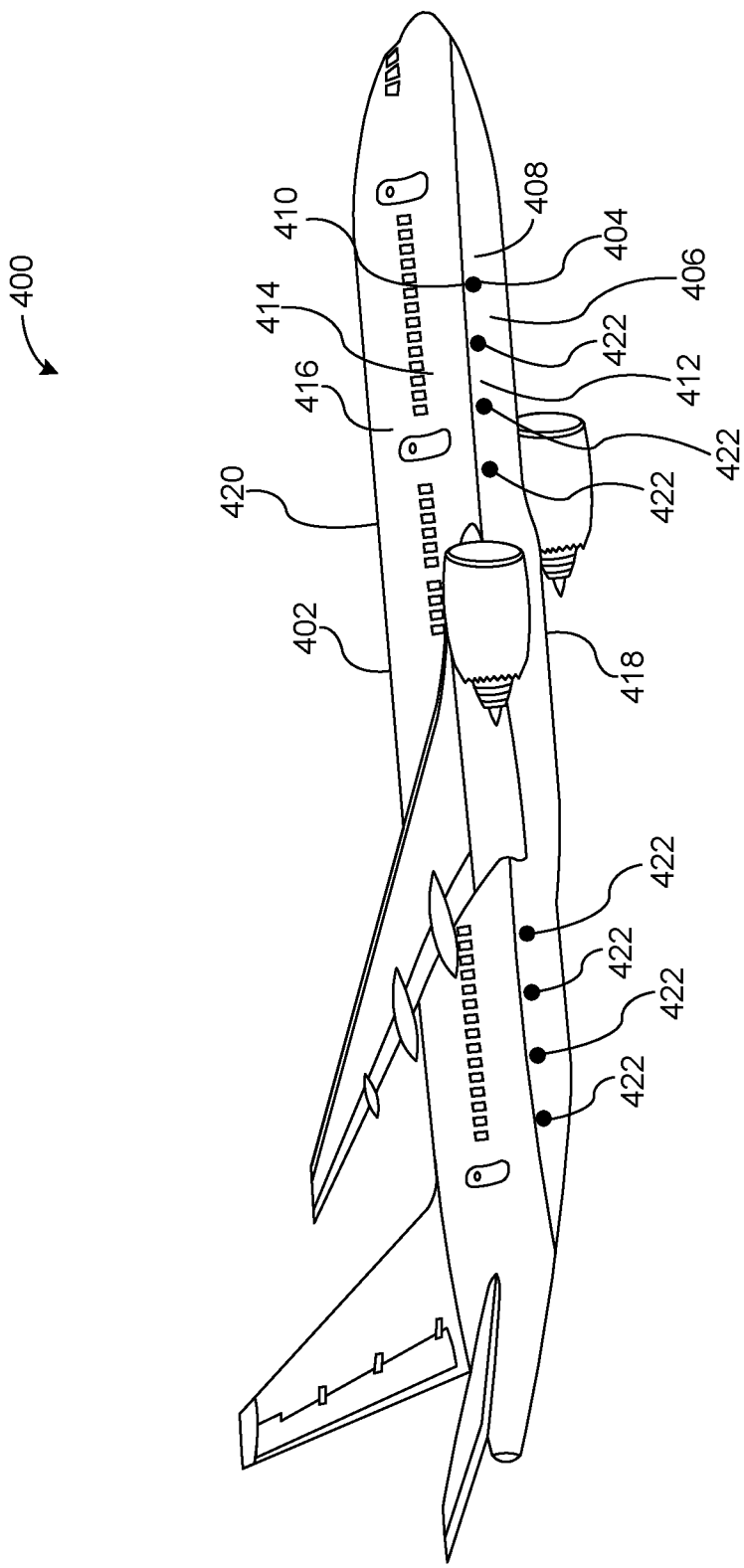
FIG. 4 is a perspective view of an example aircraft including an example fuselage having an example embedded structural battery constructed in accordance with the teachings of this disclosure.

FIG. 4 is a perspective view of an example aircraft 400 including an example fuselage 402 having an example embedded structural battery 404 constructed in accordance with the teachings of this disclosure. In some examples, the structural battery 404 of FIG. 4 may be implemented via the structural battery 100 of FIGS. 1-3 described above. In the illustrated example of FIG. 4, the fuselage 402 of the aircraft 400 includes an example wall 406 having an example outer surface and/or outer skin 408. The structural battery 404 of FIG. 4 is embedded in the wall 406 of the fuselage 402 of FIG. 4 such that an example outer structural surface 410 of the structural battery 404 is substantially flush with a portion of the outer surface 408 of the wall 406 surrounding the structural battery 404. The structural battery 404 of FIG. 4 may accordingly be accessed from a location outside of the fuselage 402 of the aircraft 400 of FIG. 4. In other examples, the structural battery 404 of FIG. 4 may positively, additionally or alternatively be accessed from a location within the fuselage 402 of the aircraft 400 of FIG. 4.

In the illustrated example of FIG. 4, the outer structural surface 410 of the structural battery 404 has a circular shape corresponding to a circular shape formed in the outer surface 408 of the wall 406 of the fuselage 402. The outer structural surface 410 of the structural battery 404 of FIG. 4 is curved to match and/or align with a corresponding curved shape of the portion of the outer surface 408 of the wall 406 surrounding the structural battery 404. The structural battery 404 of FIG. 4 is removably coupled to the wall 406 of the fuselage 402 via one or more fastening and/or coupling mechanisms. For example, the structural battery 404 of FIG. 4 may include threads (e.g., similar to the threads 112 of the structural battery 100 of FIGS. 1-3) that may be received by and/or mate with corresponding receiving threads formed in the wall 406 of the fuselage 402 of FIG. 4 to removably couple the structural battery 404 to the wall 406. As another example, the structural battery 404 of FIG. 4 may be removably coupled to the wall 406 of the fuselage 402 of FIG. 4 via one or more magnetic fasteners. As another example, the structural battery 404 of FIG. 4 may be removably coupled to the wall 406 of the fuselage 402 of FIG. 4 via a vacuum-based pressure differential (e.g., via a univalve).

In the illustrated example of FIG. 4, the structural battery 404 is embedded within the wall 406 of the fuselage 402 at and/or along an example lower portion 412 of the fuselage 402. In other examples, the structural battery 404 of FIG. 4 may be embedded in the wall 406 of the fuselage 402 at and/or along one of an example middle portion 414 of the fuselage 402, an example upper portion 416 of the fuselage 402, an example underside 418 of the fuselage 402, or an example topside 420 of the fuselage 402. As shown in FIG. 4, additional example structural batteries 422 are also embedded in the wall 406 of the fuselage 402 at and/or along the lower portion 412 of the fuselage 402. The aircraft 400 may include any number of additional structural batteries 422, and respective ones of such additional structural batteries 422 may be embedded in the wall 406 of the fuselage 402 at and/or along any of the lower portion 412, the middle portion 414, the upper portion 416, the underside 418, and/or the topside 420 of the fuselage 402. Respective ones of the additional structural batteries 422 may be of myriad size and/or shape, including sizes and/or shapes that differ from the size and/or shape of the structural battery 404 of FIG. 4 and/or the structural battery 100 of FIG. 1 described above. The structural battery 404 and the additional structural batteries 422 of FIG. 4 may be located, positioned and/or embedded in any combinatorically permutated arrangement, configuration, pattern and/or mosaic, including the arrangement, configuration and pattern shown in the illustrated example of FIG. 4.

Figure 5:
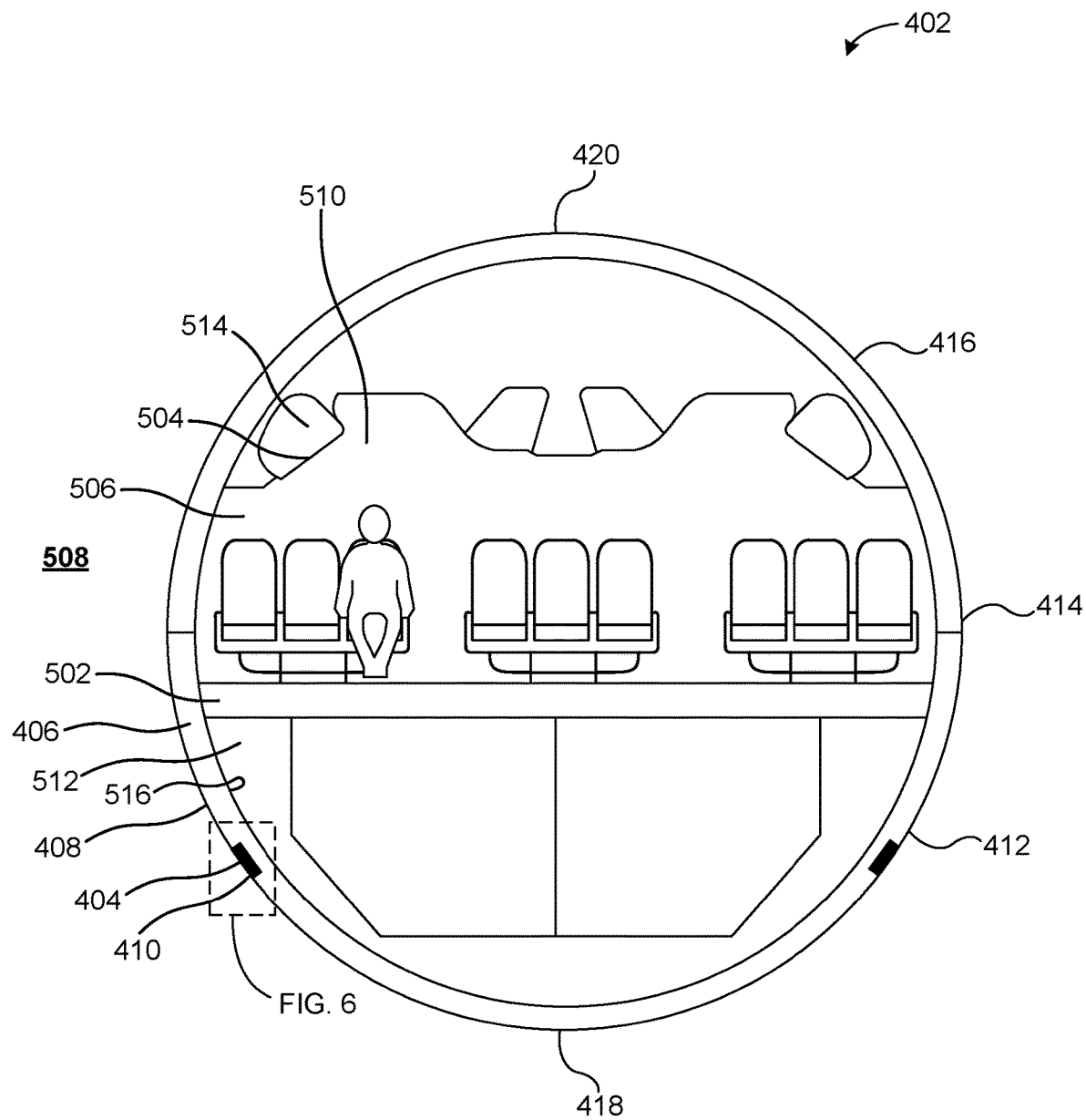
FIG. 5 is a cross-sectional view of the example fuselage of FIG. 4 including the example structural battery of FIG. 4.
Figure 6:
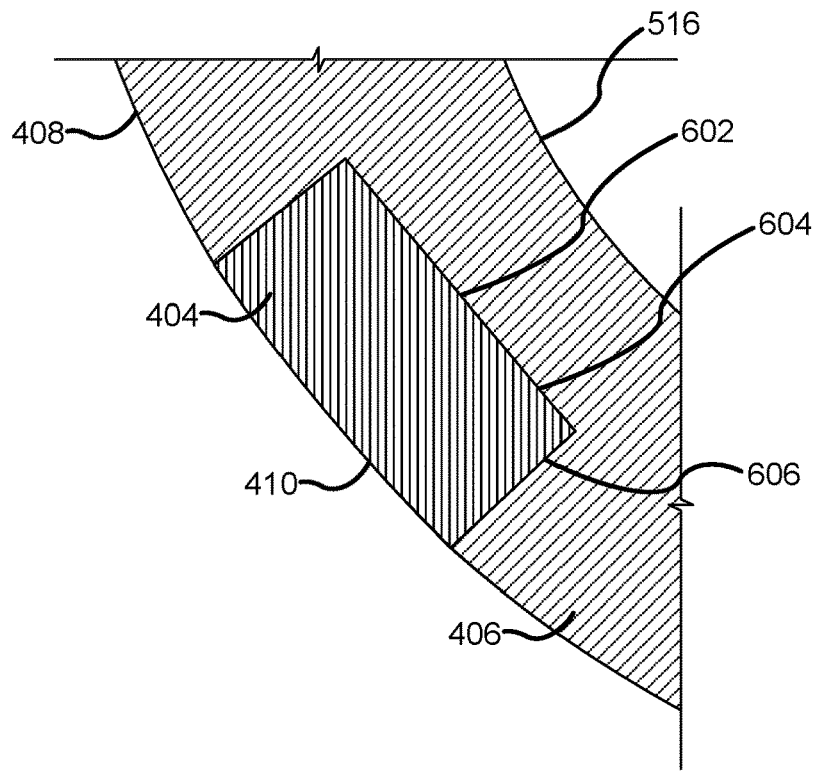
FIG. 6 is an enlarged view of a portion of FIG. 5.

FIG. 5 is a cross-sectional view of the example fuselage 402 of FIG. 4 including the example structural battery 404 of FIG. 4. FIG. 6 is an enlarged view of a portion of FIG. 5. As shown in the illustrated example of FIG. 5, the fuselage 402 includes the wall 406 of FIG. 4 and further includes an example floor 502 and an example overhead storage compartment wall 504. The wall 406 of the fuselage 402 separates an example internal area 506 of the fuselage 402 from an example external ambient environment 508 surrounding the fuselage 402. The floor 502 of the fuselage 402 separates an example cabin area 510 of the fuselage 402 from an example cargo area 512 of the fuselage 402. The overhead storage compartment wall 504 of the fuselage 402 separates an example overhead storage compartment area 514 of the fuselage 402 from the cabin area 510 of the fuselage 402. The wall 406, the floor 502, the overhead storage compartment wall 504, the internal area 506, the cabin area 510, the cargo area 512, and/or the overhead storage compartment area 514 of FIG. 5 may be of myriad size, shape, arrangement, and/or configuration, including the respective sizes, shapes, arrangements and/or configuration as shown in the illustrated example of FIG. 5.

As shown in the illustrated example of FIGS. 5 and 6, the wall 406 of the fuselage 402 includes the outer surface and/or outer skin 408 and further includes an example inner surface and/or inner skin 516 located opposite the outer surface and/or outer skin 408. As shown in FIG. 6, an example recess 602 is formed in the wall 406 of the fuselage 402. The recess 602 of the wall 406 inwardly and/or rectilinearly extends/distends from the outer surface 408 of the wall 406 toward the inner surface 516 of the wall 406. In other distention examples, the recess 602 may instead outwardly extend from the inner surface 516 of the wall 406 toward the outer surface 408 of the wall 406. In the illustrated example of FIG. 6, the recess 602 extends partially, but not completely, through the wall 406. In other examples, the recess 602 of FIG. 6 may be an opening that extends through the wall 406.

As shown in FIG. 6, the structural battery 404 includes the outer structural surface 410 and further includes an example inner structural surface 604 located opposite the outer structural surface 410, an example peripheral surface 606 extending between the outer structural surface 410 and the inner structural surface 604. In some examples, the outer structural surface 410 of the structural battery 404 of FIGS. 4-6 may correspond to the first structural surface 104 of the structural battery 100 of FIGS. 1-3 described above, the inner structural surface 604 of the structural battery 404 of FIGS. 4-6 may correspond to the second structural surface 106 of the structural battery 100 of FIGS. 1-3 described above, and the peripheral surface 606 of the structural battery 404 of FIGS. 4-6 may correspond to the peripheral surface 110 of the structural battery 100 of FIGS. 1-3 described above.

In the illustrated example of FIG. 6, the recess 602 is sized, shaped, and/or configured to receive the inner structural surface 604, the peripheral surface 606, and/or, more generally, the structural battery 404 of FIGS. 4-6 such that the structural battery 404 is embedded in the wall 406 of the fuselage 402 of FIGS. 4-6 within the recess 602 of the wall 406. The recess 602 of FIG. 6 may be of any size, shape, and/or configuration corresponding to and/or configured to mate with the size, shape, and/or configuration of the structural battery 404 of FIGS. 4-6. In the illustrated example of FIGS. 5 and 6, the structural battery 404 is embedded in the wall 406 of the fuselage 402 (e.g., within the recess 602 of the wall 406) between the outer surface 408 and the inner surface 516 of the wall 406 such that the outer structural surface 410 of the structural battery 404 is flush with the outer surface 408 of the wall 406. As shown in FIG. 6, the outer structural surface 410 of the structural battery 404 is curved to match and/or align with a corresponding curved shape of the portion of the outer surface 408 of the wall 406 surrounding the structural battery 404.

When the structural battery 404 is embedded in the recess 602 of the wall 406 of the fuselage 402 as shown in FIG. 6, the outer structural surface 410 of the structural battery 404 interfaces with and/or is exposed to cold air and/or an associated airflow that may be present (e.g., during an underway flight of the aircraft 400) in the external ambient environment 508 surrounding the fuselage 402 of the aircraft 400. Exposing the outer structural surface 410 of the structural battery 404 to such cold (e.g., frigid) air and/or airflow enables the outer structural surface 410 and/or, more generally, the structural battery 404 to be cooled during operation of the structural battery 404 and/or the aircraft 400.

Figure 7:
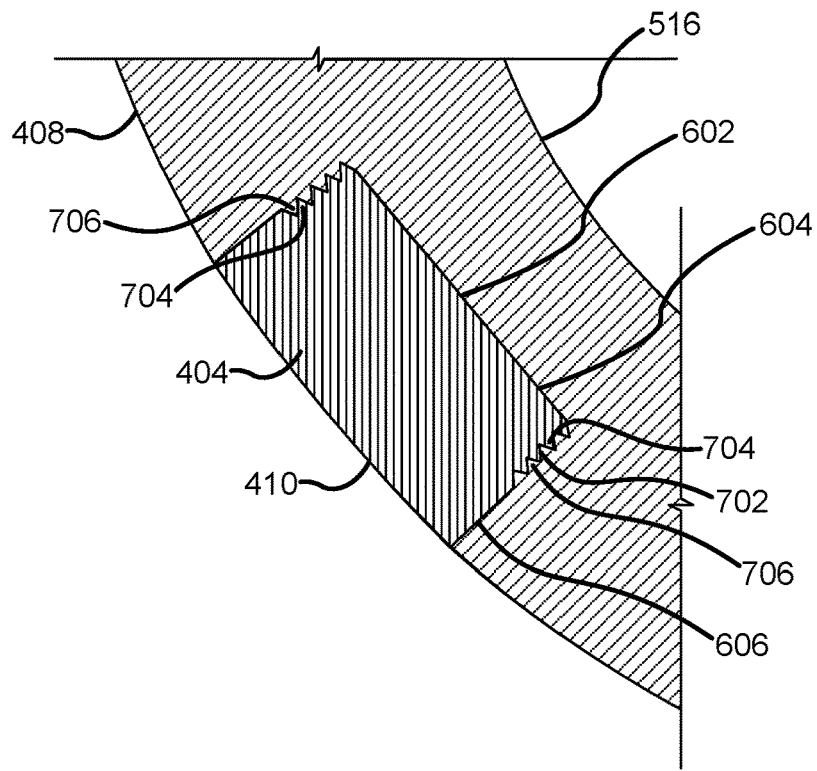
FIG. 7 is a cross-sectional view of FIG. 6 modified to illustrate an example threaded connection via which the example structural battery of FIGS. 4-6 may be removably coupled to the example wall of the example fuselage of FIGS. 4-6.

In some examples, the structural battery 404 of FIGS. 4-6 may be removably coupled to the recess 602 and/or, more generally, the wall 406 of the fuselage 402 of FIGS. 4-6 via one or more fastening and/or coupling mechanisms. For example, FIG. 7 is a cross-sectional view of FIG. 6 modified to illustrate an example threaded connection 702 via which the example structural battery 404 of FIGS. 4-6 may be removably coupled to the example wall 406 of the example fuselage 402 of FIGS. 4-6. In the illustrated example of FIG. 7, the threaded connection 702 is formed via example threads 704 formed on the structural battery 404 mating with example receiving threads 706 formed in the recess 602. In some examples, the threads 704 of the structural battery 404 may be threaded into the receiving threads 706 of the recess 602 such that the outer structural surface 410 of the structural battery 404 is flush with the portion of the outer surface 408 of the wall 406 surrounding the structural battery 404, as shown in FIG. 7. In some examples, the threaded connection 702 may be formed by hand-tightening, rotating and/or torquing the structural battery 404 into the recess 602 to a desired, known and/or learned position where the outer structural surface 410 of the structural battery 404 is a desired, known and/or learned distance from the outer surface 408 of the wall 406.

Figure 8:
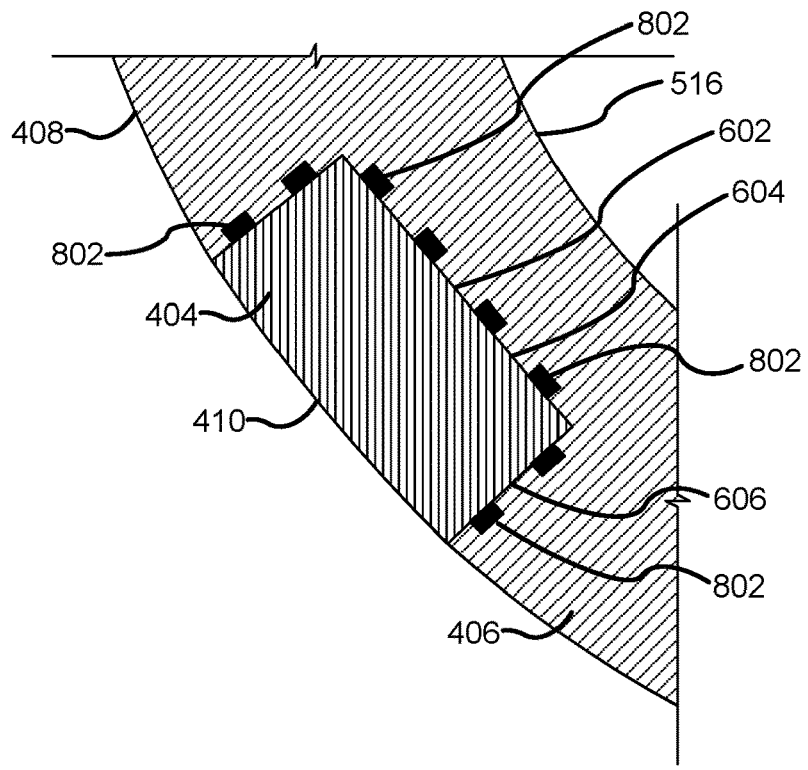
FIG. 8 is a cross-sectional view of FIG. 6 modified to illustrate example magnetic fasteners via which the example structural battery of FIGS. 4-6 may be removably coupled to the example wall of the example fuselage of FIGS. 4-6.

As another example, FIG. 8 is a cross-sectional view of FIG. 6 modified to illustrate example magnetic fasteners 802 via which the example structural battery 404 of FIGS. 4-6 may be removably coupled to the example wall 406 of the example fuselage 402 of FIGS. 4-6. In the illustrated example of FIG. 8, the magnetic fasteners 802 are formed in and/or along the recess 602 of the wall 406. The inner structural surface 604, the peripheral surface 606, and/or, more generally, the structural battery 404 may have magnetic properties that enable a magnetic force generated by and/or applied to the magnetic fasteners 802 of FIG. 8 to secure, attract, recruit, retain and/or otherwise couple the structural battery 404 to the recess 602 of the wall 406. In some examples, the magnetic force generated by and/or applied to the magnetic fasteners 802 of FIG. 8 may be automatically disabled and/or disengaged to enable the structural battery 404 to be removed, ejected and/or effused from the recess 602 of the wall 406 of the fuselage 402.

Figure 9:
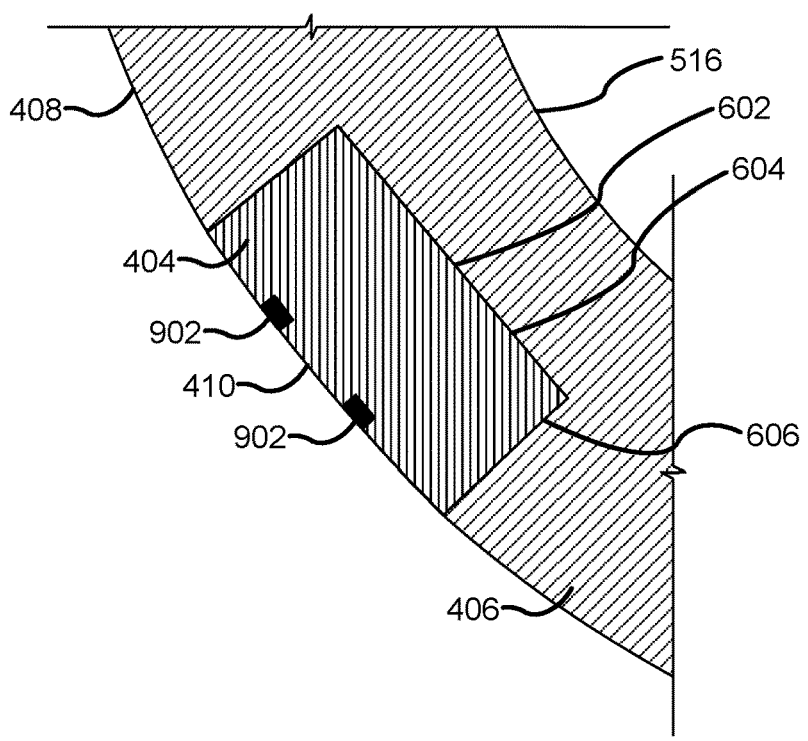
FIG. 9 is a cross-sectional view of FIG. 6 modified to illustrate example electrodes via which the example structural battery of FIGS. 4-6 may be charged.

In some examples, the structural battery 404 of FIGS. 4-6 may be charged and/or recharged via one or more charging mechanisms. For example, FIG. 9 is a cross-sectional view of FIG. 6 modified to illustrate example electrodes 902 via which the example structural battery 404 of FIGS. 4-6 may be charged. The electrodes 902 of FIG. 9 are formed on and/or in the outer structural surface 410 of the structural battery 404. The electrodes 902 of FIG. 9 may accordingly be changed, handled and/or accessed from a location outside of the fuselage 402 of the aircraft 400 of FIGS. 4-6. In some examples, the electrodes 902 of FIG. 9 may further enable discharging of the structural battery 404, and/or voltage/capacitance sensing of the structural battery 404. In some examples, the electrodes 902 of FIG. 9 may enable setting and/or equating of voltage and/or capacitance of the structural battery 404 to target-/golden-equilibrium via control logic and/or coding associated with the electrodes 902. In some examples, the structural battery 404 may be rapidly charged where a charger may detect the health or status of the structural battery 404, where such detection may include avoidance of destructive charging or discharging.

Figure 10:
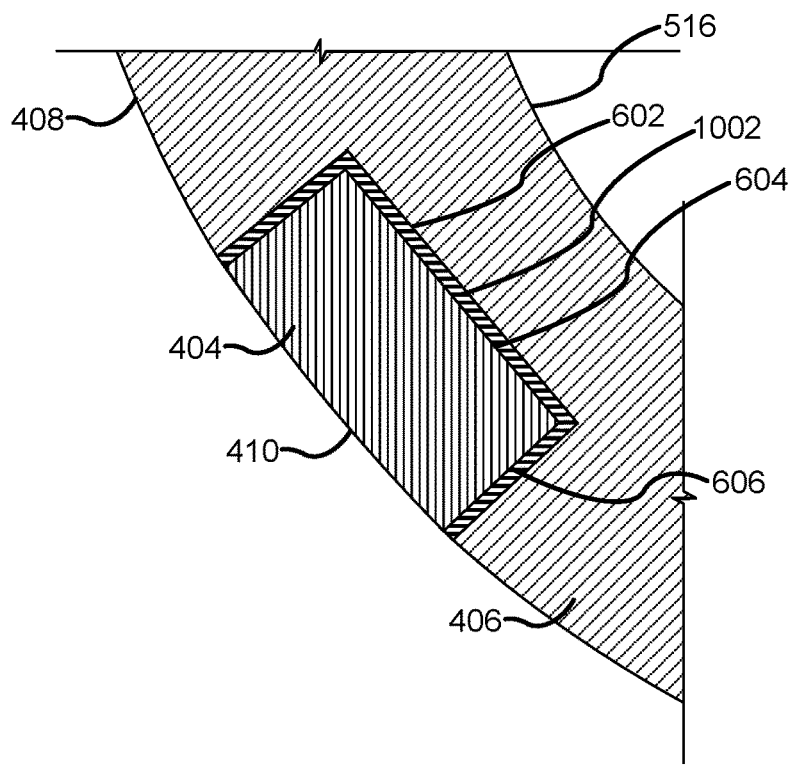
FIG. 10 is a cross-sectional view of FIG. 6 modified to illustrate an example seal located between the example structural battery of FIGS. 4-6 and the example wall of the example fuselage of FIGS. 4-6.

In some examples, a seal (e.g., a weathertight seal, a lightening seal, a hermetic seal, etc.) may be rightly formed between the structural battery 404 of FIGS. 4-6 and the recess 602 and/or, more generally, the wall 406 of the fuselage 402 of FIGS. 4-6. For example, FIG. 10 is a cross-sectional view of FIG. 6 modified to illustrate an example seal 1002 located between the example structural battery 404 of FIGS. 4-6 and the example wall 406 of the example fuselage 402 of FIGS. 4-6. In the illustrated example of FIG. 10, the seal 1002 is coupled (e.g., fixedly coupled) and/or adhered to one or more portions of the surfaces of the recess 602 of the wall 406. The inner structural surface 604 and/or the peripheral surface 606 of the structural battery 404 contact(s) the seal 1002 of FIG. 10 when the structural battery 404 is coupled to and/or embedded in the recess 602 of the wall 406, as shown in FIG. 10. As further shown in the illustrated example of FIG. 10, the seal 1002 of FIG. 10 is located between the outer structural surface 410 of the structural battery 404 and the portion of the outer surface 408 of the wall 406 surrounding the structural battery 404.

In other examples, the seal 1002 of FIG. 10 may alternatively be coupled (e.g., fixedly coupled) and/or adhered to one or more portions of the inner structural surface 604 and/or the peripheral surface 606 of the structural battery 404. In such other examples, one or more portions of the surfaces of the recess 602 of the wall 406 contact(s) the seal 1002 of the structural battery 404 when the structural battery 404 is coupled to and/or embedded in the recess 602 of the wall 406.

Figure 11:
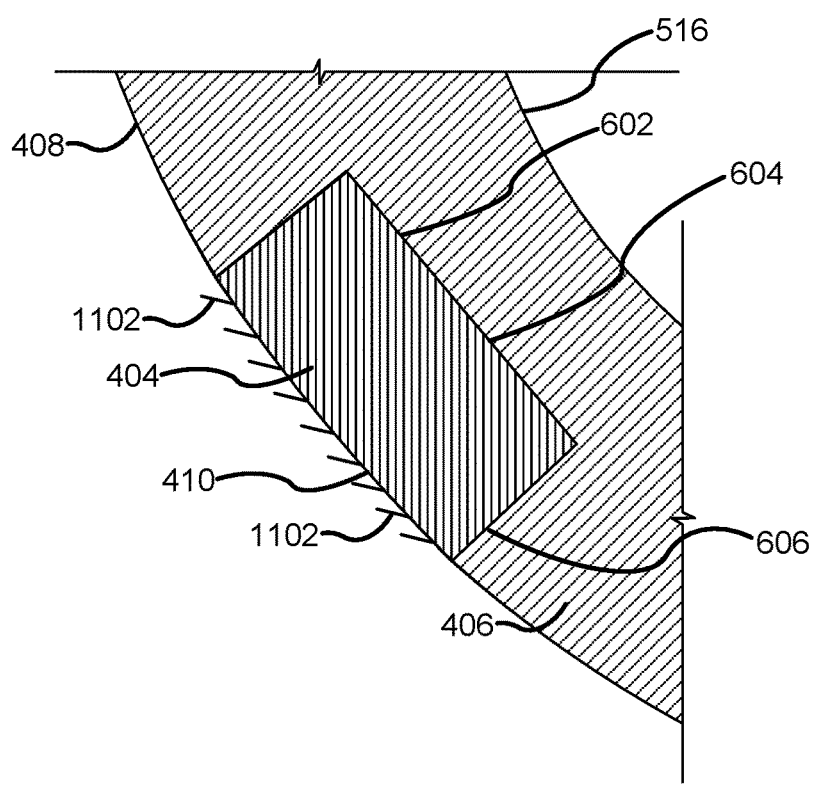
FIG. 11 is a cross-sectional view of FIG. 6 modified to illustrate example fins via which the example structural battery of FIGS. 4-6 may be inductively cooled.

In some examples, the structural battery 404 of FIGS. 4-6 may be convectively, radiatively and/or inductively cooled via one or more inductive cooling mechanisms (e.g., thermal straps, thermal grease, liquid cooling, fins, etc.). For example, FIG. 11 is a cross-sectional view of FIG. 6 modified to illustrate example fins 1102 via which the example structural battery 404 of FIGS. 4-6 may be inductively cooled. The fins 1102 of FIG. 11 are formed on and/or in the outer structural surface 410 of the structural battery 404 and extend outwardly therefrom. The fins 1102 of FIG. 11 are accordingly accessible from a location outside of the fuselage 402 of the aircraft 400 of FIGS. 4-6. The fins 1102 of FIG. 11 may direct and/or induce air and/or an associated airflow present in the external ambient environment 508 surrounding the fuselage 402 to move toward and/or past the outer structural surface 410 of the structural battery 404 of FIGS. 4-6. Directing, entraining and/or inducing such air and/or airflow toward and/or past the outer structural surface 410 of the structural battery 404 enables the outer structural surface 410 and/or, more generally, the structural battery 404 to be cooled (e.g., rapidly cooled) during operation of the structural battery 404 and/or the aircraft 400. The fins 1102 of FIG. 11 may be aligned with flow vorticies and/or may redirect flow. The fins 1102 of FIG. 11 may alternatively be rods or other shapes that may enable convective and/or radiative heat transfer.

Figure 12:
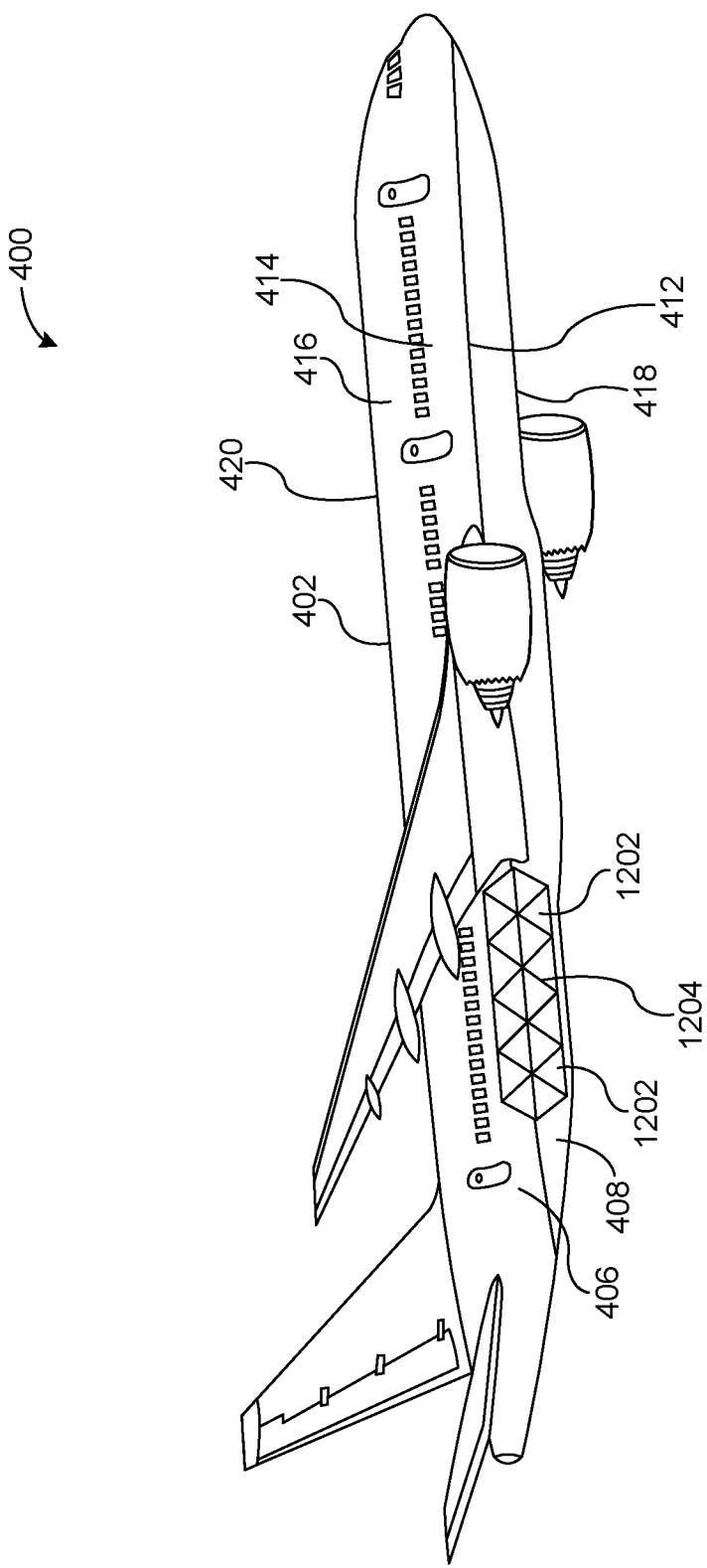
FIG. 12 is perspective view of the example fuselage of FIG. 4 modified to illustrate example structural batteries having triangular shapes corresponding to an example triangular-shaped pattern associated with fuselage.

FIG. 12 is a perspective view of the example fuselage 402 of FIG. 4 modified to illustrate example structural batteries 1202 having triangular shapes corresponding to an example triangular-shaped pattern 1204 associated with fuselage 402. Respective ones of the triangular-shaped structural batteries 1202 of FIG. 12 are embedded in corresponding respective triangular-shaped recesses that define the triangular-shaped pattern 1204 of FIG. 12. In some examples, respective ones of the triangular-shaped structural batteries 1202 of FIG. 12 may be coupled to one or more other respective ones of the triangular-shaped structural batteries 1202. In the illustrated example of FIG. 12, the triangular-shaped pattern 1204 is an iso-grid pattern formed in and/or on the wall 406 of the fuselage 402. In some examples, the triangular-shaped pattern 1204 may be formed in and/or on a portion of the outer surface 408 of the wall 406. For example, the triangular-shaped pattern 1204 of FIG. 12 is formed along the lower portion 412 of the wall 406 of the fuselage 402. In other examples, the triangular-shaped pattern 1204 may be formed along one or more additional and/or different portions of the wall 406 of the fuselage 402 (e.g. the middle portion 414, the upper portion 416, the underside 418, and/or the topside 420). In some examples, the triangular-shaped pattern 1204 may be formed and/or extend along and/or over the substantial entirety of the wall 406 of the fuselage 402.

Figure 13:
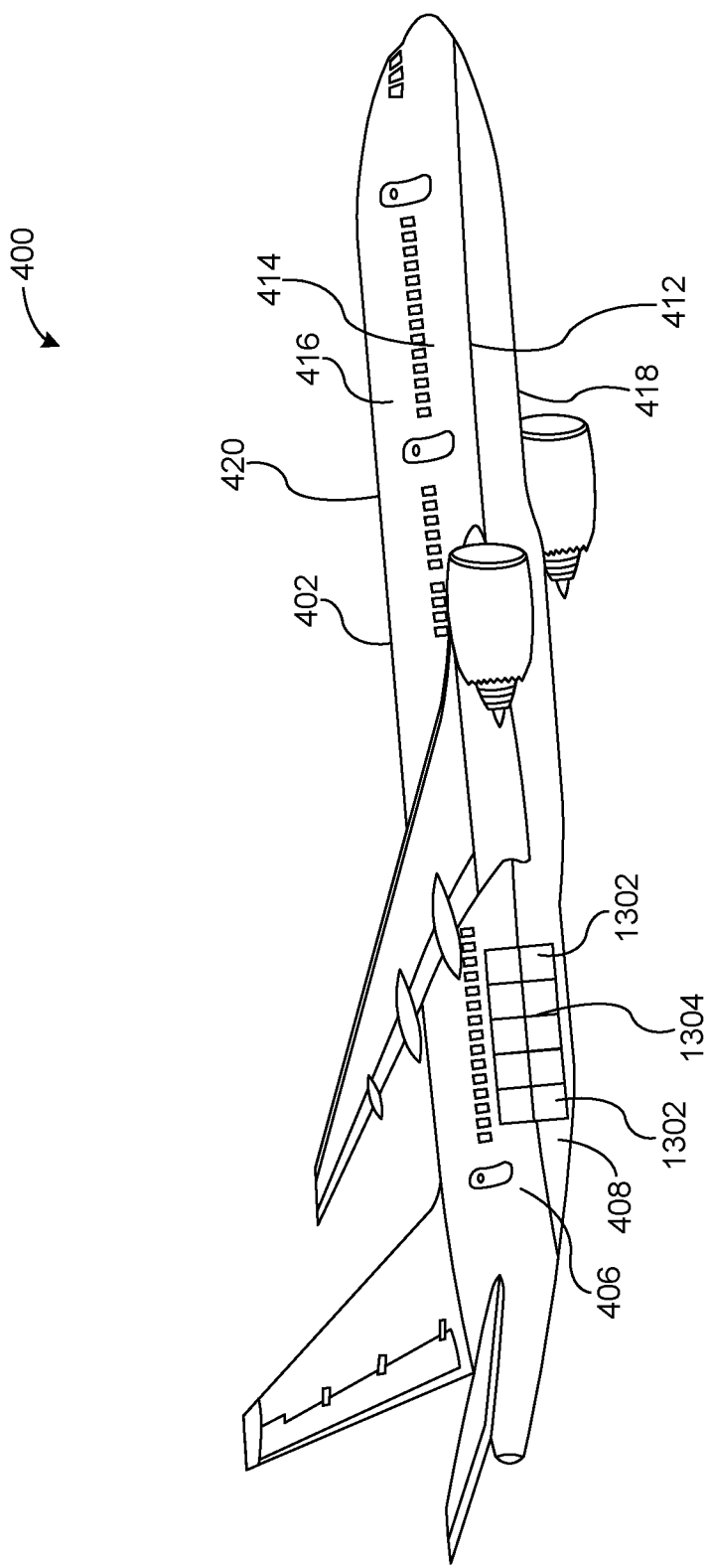
FIG. 13 is a perspective view of the example fuselage of FIG. 4 modified to illustrate example structural batteries having rectangular shapes corresponding to an example rectangular-shaped pattern associated with fuselage.

FIG. 13 is a perspective view of the example fuselage 402 of FIG. 4 modified to illustrate example structural batteries 1302 having rectangular shapes corresponding to an example rectangular-shaped pattern 1304 associated with fuselage 402. Respective ones of the rectangular-shaped structural batteries 1302 of FIG. 13 are embedded in corresponding respective rectangular-shaped recesses that define the rectangular-shaped pattern 1304 of FIG. 13. In some examples, respective ones of the rectangular-shaped structural batteries 1302 of FIG. 13 may be coupled to one or more other respective ones of the rectangular-shaped structural batteries 1302. In the illustrated example of FIG. 13, the rectangular-shaped pattern 1304 is an ortho-grid pattern formed in and/or on the wall 406 of the fuselage 402. In some examples, the rectangular-shaped pattern 1304 may be formed in and/or on a portion of the outer surface 408 of the wall 406. For example, the rectangular-shaped pattern 1304 of FIG. 13 is formed along the lower portion 412 of the wall 406 of the fuselage 402. In other examples, the rectangular-shaped pattern 1304 may be formed along one or more additional and/or different portions of the wall 406 of the fuselage 402 (e.g. the middle potion 414, the upper portion 416, the underside 418, and/or the topside 420). In some examples, the rectangular-shaped pattern 1304 may be formed and/or extend along and/or over the substantial entirety of the wall 406 of the fuselage 402.

Figure 14:
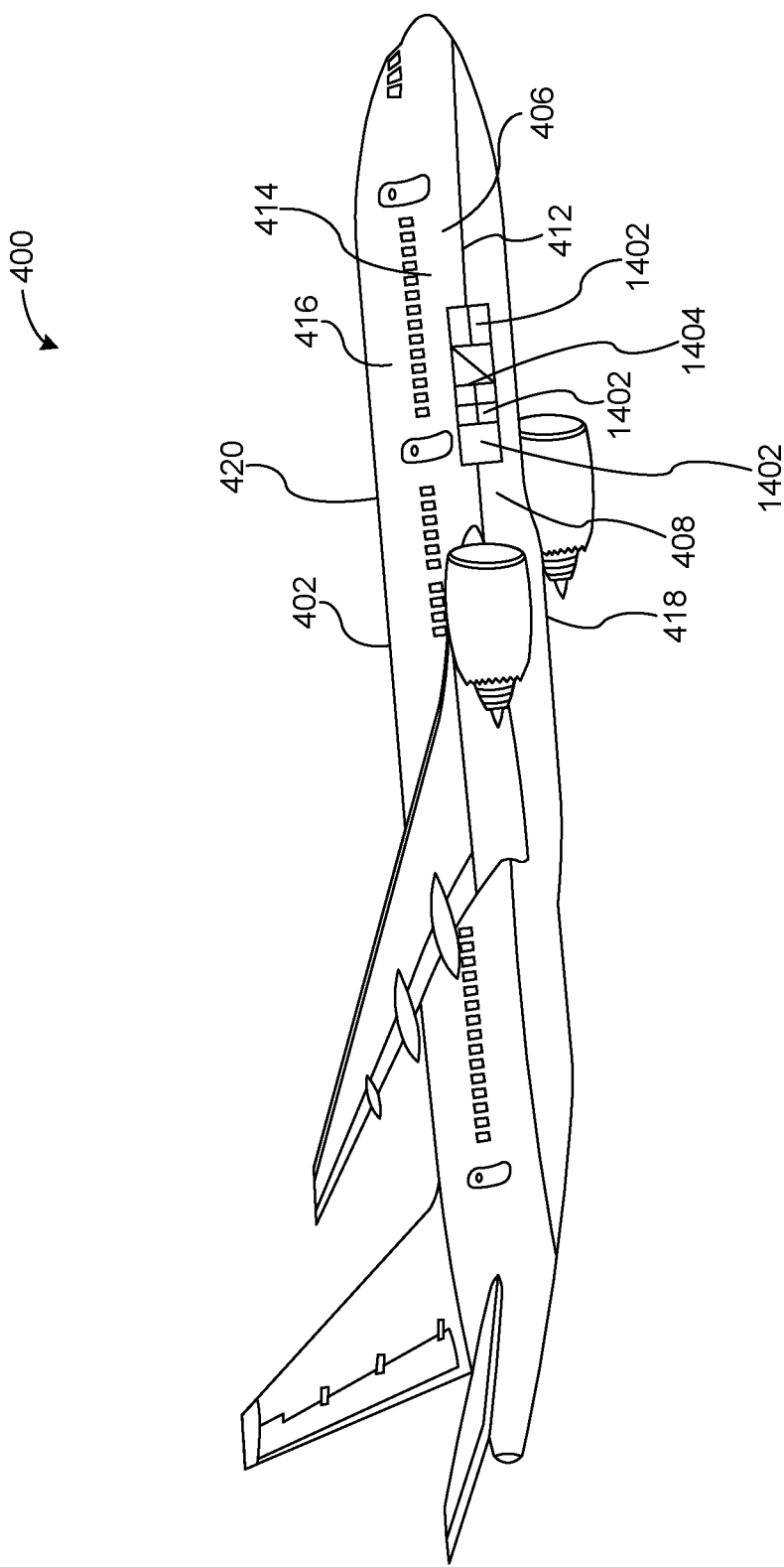
FIG. 14 is a perspective view of the example fuselage of FIG. 4 modified to illustrate example structural batteries arranged in an example mosaic arrangement.

FIG. 14 is a perspective view of the example fuselage 402 of FIG. 4 modified to illustrate example structural batteries 1402 arranged in an example mosaic arrangement 1404. In the illustrated example of FIG. 14, the mosaic arrangement 1404 is constructed of structural batteries 1402 of differing shapes (e.g., rectangles of differing sizes and/or configurations, triangles of differing sizes and/or configurations, etc.). Respective ones of the structural batteries 1402 of FIG. 14 are embedded in corresponding respective recesses that define the mosaic arrangement 1404 of FIG. 14. In some examples, respective ones of the structural batteries 1402 of FIG. 14 may be coupled to one or more other respective ones of the structural batteries 1402. In some examples, the mosaic arrangement 1404 may be formed in and/or on a portion of the outer surface 408 of the wall 406. For example, the mosaic arrangement 1404 of FIG. 14 is formed along the lower portion 412 of the wall 406 of the fuselage 402. In other examples, the mosaic arrangement 1404 may be formed along one or more additional and/or different portions of the wall 406 of the fuselage 402 (e.g. the middle portion 414, the upper portion 416, the underside 418, and/or the topside 420). In some examples, the mosaic arrangement 1404 may be formed and/or extend along and/or over the substantial entirety of the wall 406 of the fuselage 402. In some examples, a structural battery mosaic density associated with a mosaic arrangement of structural batteries may be represented as $$\frac{\sum_{i=1}^{K} S_i}{\gamma} = \Lambda$$

where K is the structural battery quantity (e.g., the total number of infinitely countable structural batteries with a range of $(1, \aleph_0)$), $S_i$ is a structural battery surface area, $\gamma$ is the wetted surface area of the aircraft, and $\Lambda$ is the ratio of skin covered with structural batteries (e.g., the structural battery surface area density). In some examples, $\Lambda$ may have a value equal to 1.0.

Figure 15:
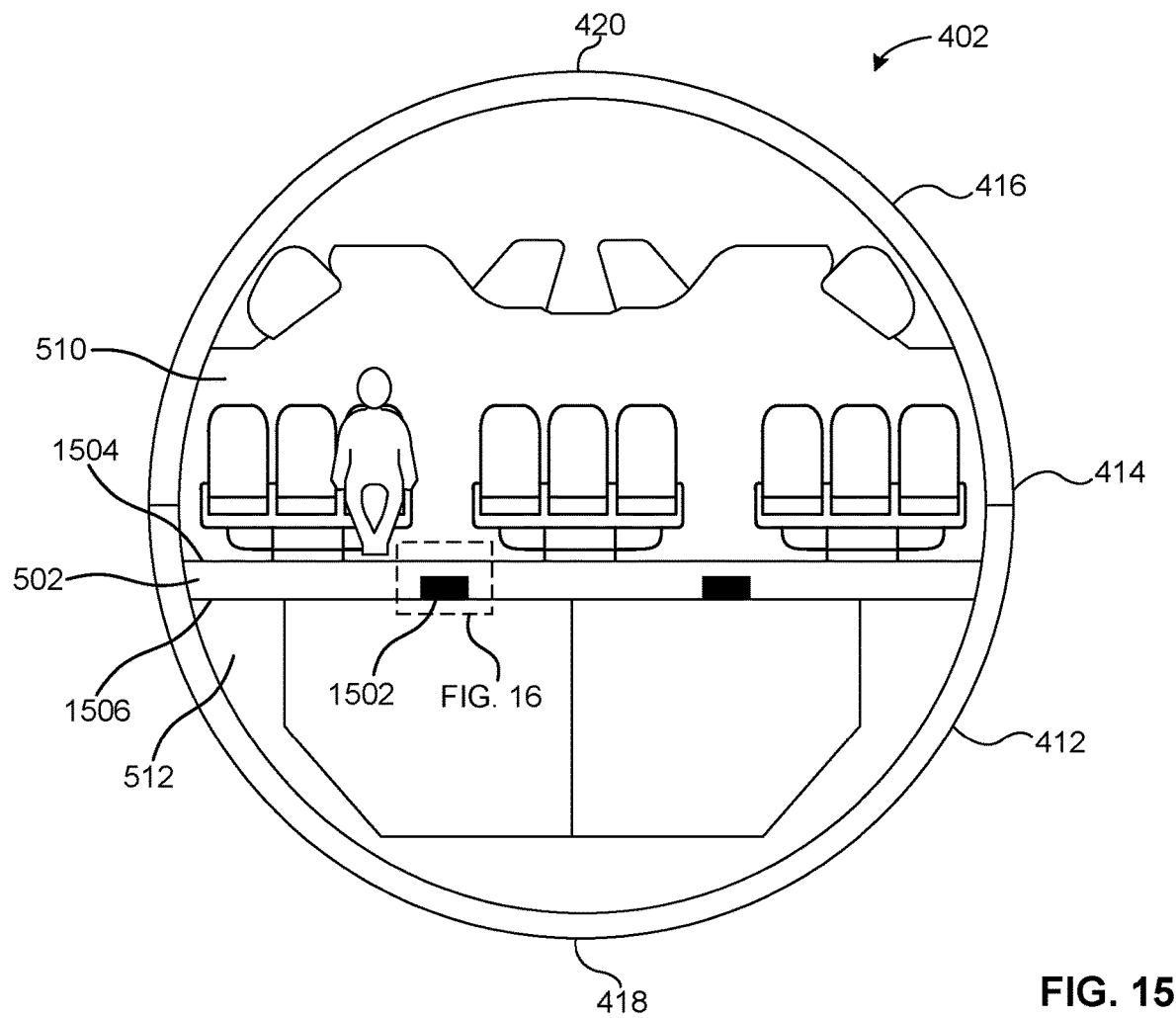
FIG. 15 is a cross-sectional view of the example fuselage of FIGS. 4 and 5 modified to include an example structural battery embedded in the example floor of the fuselage.
Figure 16:
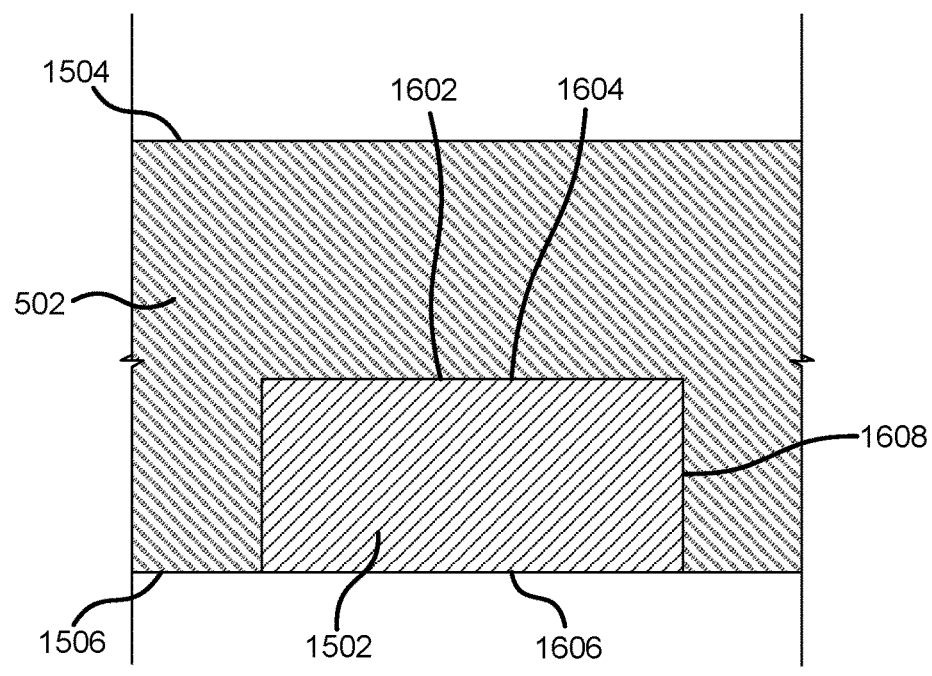
FIG. 16 is an enlarged view of a portion of FIG. 15.

FIG. 15 is a cross-sectional view of the example fuselage 402 of FIGS. 4 and 5 modified to include an example structural battery 1502 embedded in the example floor 502 of the fuselage 402. FIG. 16 is an enlarged view of a portion of FIG. 15. As discussed above in connection with FIG. 5, the floor 502 of the fuselage 402 separates the cabin area 510 of the fuselage 402 from the cargo area 512 of the fuselage 402. As shown in the illustrated example of FIGS. 15 and 16, the floor 502 of the fuselage 402 includes an example upper surface 1504 and an example lower surface 1506 located opposite the upper surface 1504. As shown in FIG. 16, an example recess 1602 is formed in the floor 502 of the fuselage 402. The recess 1602 of the floor 502 extends upwardly from the lower surface 1506 of the floor 502 toward the upper surface 1504 of the floor 502. In other examples, the recess 1602 may instead extend downwardly from the upper surface 1504 of the floor 502 toward the lower surface 1506 of the floor 502. In the illustrated example of FIG. 16, the recess 1602 extends partially, but not completely, through the floor 502. In other examples, the recess 1602 of FIG. 16 may be an opening that extends through the floor 502.

As shown in FIG. 16, the structural battery 1502 includes an example upper structural surface 1604, an example lower structural surface 1606 located opposite the upper structural surface 1604, and an example peripheral surface 1608 extending between the upper structural surface 1604 and the lower structural surface 1606. In some examples, the lower structural surface 1606 of the structural battery 1502 of FIGS. 15 and 16 may correspond to the first structural surface 104 of the structural battery 100 of FIGS. 1-3 described above, the upper structural surface 1604 of the structural battery 1502 of FIGS. 15 and 16 may correspond to the second structural surface 106 of the structural battery 100 of FIGS. 1-3 described above, and the peripheral surface 1608 of the structural battery 1502 of FIGS. 15 and 16 may correspond to the peripheral surface 110 of the structural battery 100 of FIGS. 1-3 described above.

In the illustrated example of FIG. 16, the recess 1602 is sized, shaped, and/or configured to receive the upper structural surface 1604, the peripheral surface 1608, and/or, more generally, the structural battery 1502 of FIGS. 15 and 16 such that the structural battery 1502 is embedded in the floor 502 of the fuselage 402 of FIGS. 15 and 16 within the recess 1602 of the floor 502. The recess 1602 of FIG. 16 may be of any size, shape, and/or configuration corresponding to and/or configured to mate with the size, shape, and/or configuration of the structural battery 1502 of FIGS. 15 and 16. In the illustrated example of FIGS. 15 and 16, the structural battery 1502 is embedded in the floor 502 of the fuselage 402 (e.g., within the recess 1602 of the floor 502) between the upper surface 1504 and the lower surface 1506 of the floor 502 such that the lower structural surface 1606 of the structural battery 1502 is flush with the lower surface 1506 of the floor 502.

In some examples, the structural battery 1502 of FIGS. 15 and 16 may be removably coupled to the recess 1602 and/or, more generally, the floor 502 of the fuselage 402 of FIGS. 15 and 16 via one or more fastening and/or coupling mechanisms. For example, the structural battery 1502 may be removably coupled to the recess 1602 via a threaded connection such as the example threaded connection 702 of FIG. 7 described above, via magnetic fasteners such as the example magnetic fasteners 802 of FIG. 8 described above, or via a vacuum-based pressure differential (e.g., via a univalve).

Figure 17:
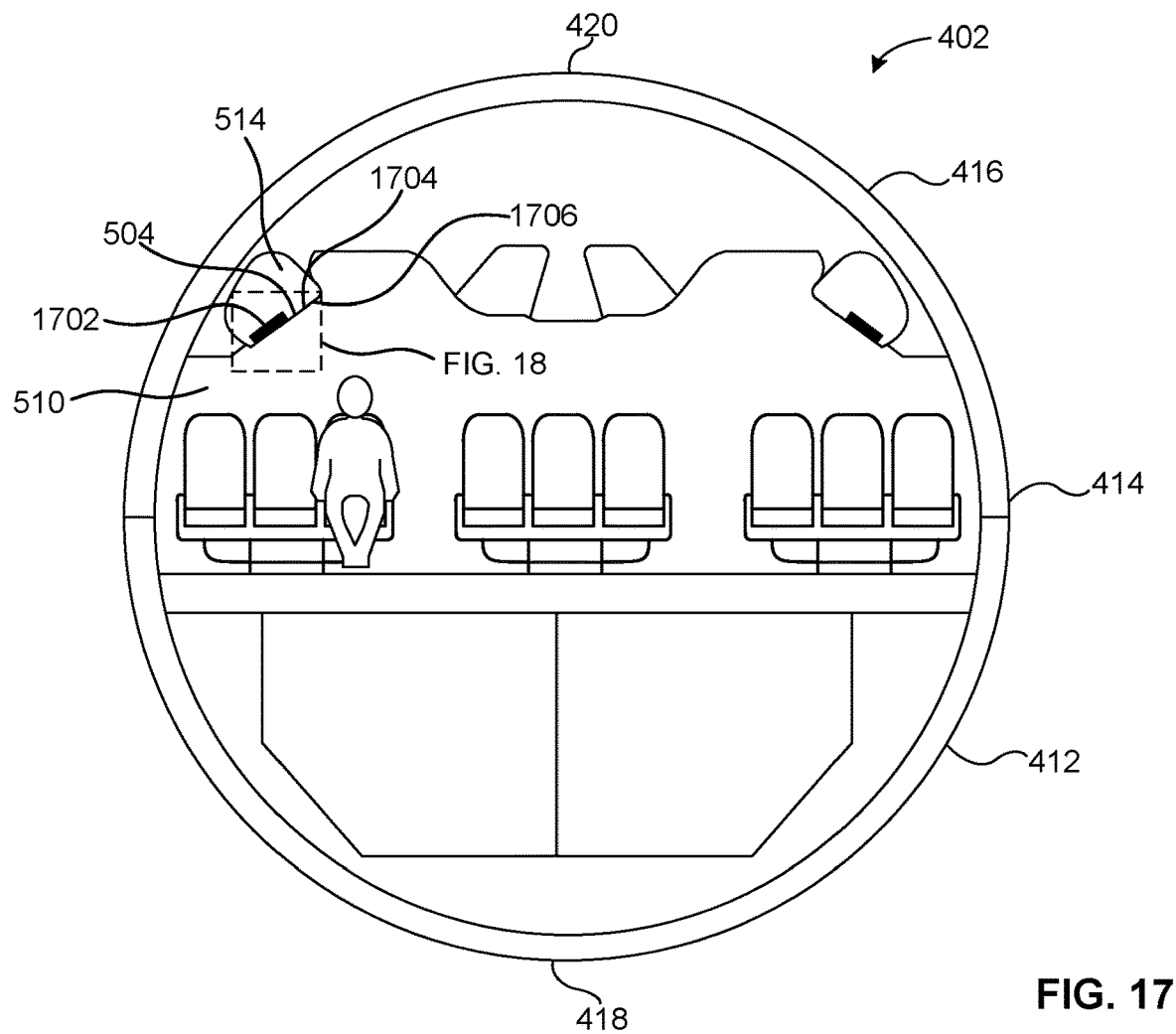
FIG. 17 is a cross-sectional view of the example fuselage of FIGS. 4, 5 and 15 modified to include an example structural battery embedded in the example overhead storage compartment wall of the fuselage.
Figure 18:
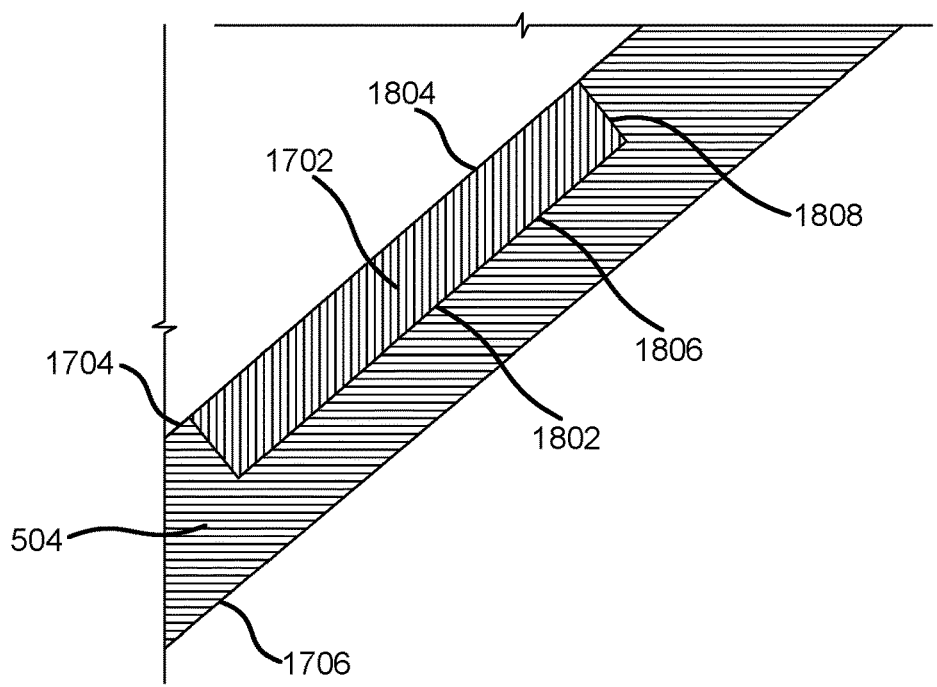
FIG. 18 is an enlarged view of a portion of FIG. 17.

FIG. 17 is a cross-sectional view of the example fuselage 402 of FIGS. 4, 5 and 15 modified to include an example structural battery 1702 embedded in the example overhead storage compartment wall 504 of the fuselage 402. FIG. 18 is an enlarged view of a portion of FIG. 17. As discussed above in connection with FIG. 5, the overhead storage compartment wall 504 of the fuselage 402 separates the overhead storage compartment area 514 of the fuselage 402 from the cabin area 510 of the fuselage 402. As shown in the illustrated example of FIGS. 17 and 18, the overhead storage compartment wall 504 of the fuselage 402 includes an example interior surface 1704 (e.g. facing toward the overhead storage compartment area 514 of the fuselage 402) and an example exterior surface 1706 (e.g., facing toward the cabin area 510 of the fuselage 402) located opposite the interior surface 1704. As shown in FIG. 18, an example recess 1802 is formed in the overhead storage compartment wall 504 of the fuselage 402. The recess 1802 of the overhead storage compartment wall 504 extends downwardly from the interior surface 1704 of the overhead storage compartment wall 504 toward the exterior surface 1706 of the overhead storage compartment wall 504. In other examples, the recess 1802 may instead extend upwardly from the exterior surface 1706 of the overhead storage compartment wall 504 toward the interior surface 1704 of the overhead storage compartment wall 504. In the illustrated example of FIG. 18, the recess 1802 extends partially, but not completely, through the overhead storage compartment wall 504. In other examples, the recess 1802 of FIG. 18 may be an opening that extends through the overhead storage compartment wall 504.

As shown in FIG. 18, the structural battery 1702 includes an example inward structural surface 1804 (e.g. facing toward the overhead storage compartment area 514 of the fuselage 402), an example outward structural surface 1806 (e.g., facing toward the cabin area 510 of the fuselage 402) located opposite the inward structural surface 1804, and an example peripheral surface 1808 extending between the inward structural surface 1804 and the outward structural surface 1806. In some examples, the inward structural surface 1804 of the structural battery 1702 of FIGS. 17 and 18 may correspond to the first structural surface 104 of the structural battery 100 of FIGS. 1-3 described above, the outward structural surface 1806 of the structural battery 1702 of FIGS. 17 and 18 may correspond to the second structural surface 106 of the structural battery 100 of FIGS. 1-3 described above, and the peripheral surface 1808 of the structural battery 1702 of FIGS. 17 and 18 may correspond to the peripheral surface 110 of the structural battery 100 of FIGS. 1-3 described above.

In the illustrated example of FIG. 18, the recess 1802 is sized, shaped, and/or configured to receive the outward structural surface 1806, the peripheral surface 1808, and/or, more generally, the structural battery 1702 of FIGS. 17 and 18 such that the structural battery 1702 is embedded in the overhead storage compartment wall 504 of the fuselage 402 of FIGS. 17 and 18 within the recess 1802 of the overhead storage compartment wall 504. The recess 1802 of FIG. 18 may be of any size, shape, and/or configuration corresponding to and/or configured to mate with the size, shape, and/or configuration of the structural battery 1702 of FIGS. 17 and 18. In the illustrated example of FIGS. 17 and 18, the structural battery 1702 is embedded in the overhead storage compartment wall 504 of the fuselage 402 (e.g., within the recess 1802 of the overhead storage compartment wall 504) between the interior surface 1704 and the exterior surface 1706 of the overhead storage compartment wall 504 such that the inward structural surface 1804 of the structural battery 1702 is flush with the interior surface 1704 of the overhead storage compartment wall 504.

In some examples, the structural battery 1702 of FIGS. 17 and 18 may be removably coupled to the recess 1802 and/or, more generally, the overhead storage compartment wall 504 of the fuselage 402 of FIGS. 17 and 18 via one or more fastening and/or coupling mechanisms. For example, the structural battery 1702 may be removably coupled to the recess 1802 via a threaded connection such as the example threaded connection 702 of FIG. 7 described above, or via magnetic fasteners such as the example magnetic fasteners 802 of FIG. 8 described above.

Figure 19:
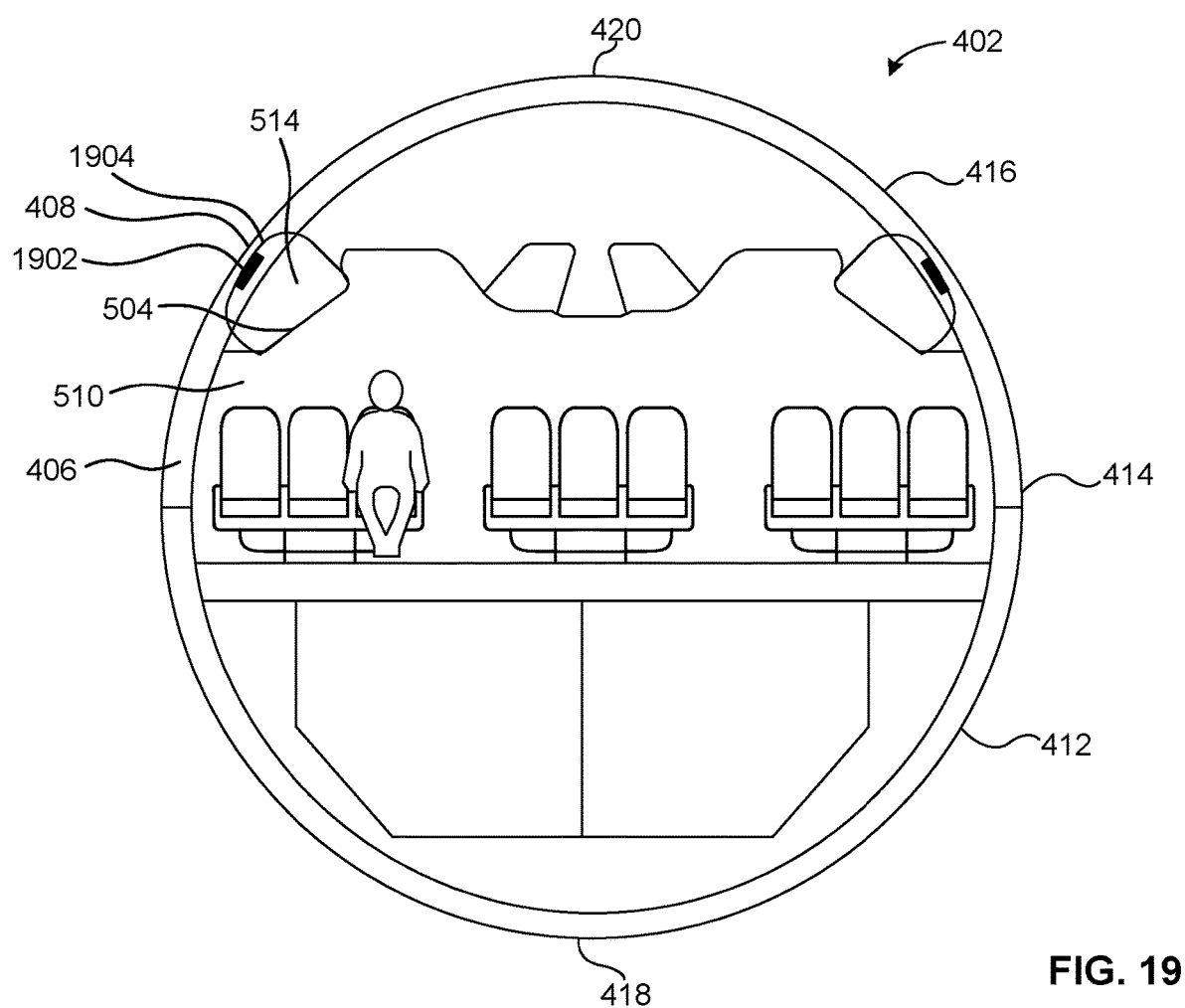
FIG. 19 is a cross-sectional view of the example fuselage of FIGS. 4, 5, 15 and 17 modified to include an example structural battery embedded in an example overhead storage compartment rear wall of the fuselage.

FIG. 19 is a cross-sectional view of the example fuselage 402 of FIGS. 4, 5, 15 and 17 modified to include an example structural battery 1902 embedded in an example overhead storage compartment rear wall 1904 of the fuselage 402. As discussed above in connection with FIG. 5, the overhead storage compartment wall 504 of the fuselage 402 separates the overhead storage compartment area 514 of the fuselage 402 from the cabin area 510 of the fuselage 402. As shown in the illustrated example of FIG. 19, the overhead storage compartment rear wall 1904 of the fuselage 402 is adjacent the outer surface 408 of the wall 406 of the fuselage 402. As a result of the structural battery 1902 being embedded in the overhead storage compartment rear wall 1904 and the overhead storage compartment rear wall 1904 being adjacent the outer surface 408 of the wall 406 of the fuselage 402, the structural battery 1902 may advantageously be conductively cooled. In some examples, the structural battery 1902 of FIG. 19 may be embedded in a recess extending inwardly from an outer surface or outwardly from an inner surface of the overhead storage compartment rear wall 1904. In some examples, the recess may be an opening that extends through the overhead storage compartment rear wall 1904.

From the foregoing, it will be appreciated that aircraft fuselage apparatus having embedded structural batteries are disclosed. The disclosed aircraft fuselage apparatus include structural batteries embedded in one or more walls of the fuselage (e.g., an outer wall of the fuselage, a floor of the fuselage, an overhead storage compartment wall of the fuselage, etc.). As a result of the structural batteries being embedded in the fuselage wall(s), the disclosed aircraft fuselage apparatus advantageously increase the weight efficiency and/or the volume efficiency associated with an aircraft. For example, by embedding the structural batteries in the fuselage wall(s), additional batteries that would otherwise be stored and/or housed at other locations in and/or on the aircraft may be eliminated from the aircraft.

In some examples, the disclosed aircraft fuselage apparatus also advantageously provide a mechanism for rapidly cooling the embedded structural batteries in a cost-efficient manner during operation of an aircraft. For example, one or more portions of the embedded structural batteries may be exposed to an ambient environment that is external to the aircraft, thereby enabling the embedded structural batteries to interface with cold air and/or an associated airflow that may be present in the ambient environment (e.g., during a flight of the aircraft), and/or for heat to be drawn from the embedded structural batteries via convective heat transfer.

In some examples, the embedded structural batteries disclosed herein may be integrally formed with one or more of the fuselage walls of the disclosed aircraft fuselage apparatus. In such examples, the embedded structural batteries and the fuselage implementing such embedded structural batteries may advantageously be concomitantly formed, fabricated and/or manufactured, thereby reducing (e.g., eliminating and/or nixing) any need to form, fabricate and/or manufacture other batteries for the aircraft separately from forming, fabricating and/or manufacturing the fuselage of the aircraft.

In some disclosed examples, an apparatus comprises a fuselage including a wall. In some disclosed examples, the wall has an outer surface, an inner surface, and a structural battery embedded in the wall between the outer surface and the inner surface.

In some disclosed examples, the wall separates an internal area of the fuselage from an external ambient environment. In some disclosed examples, the structural battery is removably coupled to the wall. In some disclosed examples, the structural battery includes an outer structural surface and an inner structural surface.

In some disclosed examples, the structural battery includes electrodes to charge the structural battery. In some disclosed examples, the electrodes are accessible via the outer structural surface of the structural battery.

In some disclosed examples, the wall includes a recess formed inwardly relative to the outer surface of the wall. In some disclosed examples, the recess is to receive the inner structural surface of the structural battery. In some disclosed examples, the outer structural surface of the structural battery is flush with the outer surface of the wall when the structural battery is received in the recess.

In some disclosed examples, the apparatus further comprises magnetic fasteners located in the recess to removably couple the structural battery to the wall.

In some disclosed examples, the inner structural surface of the structural battery has a characteristic shape to be received by a matching characteristic shape of the recess of the wall.

In some disclosed examples, the structural battery further includes a peripheral surface extending between the first structural surface and the second structural surface. In some disclosed examples, the peripheral surface has outwardly extending threads to removably couple the structural battery to the recess of the wall.

In some disclosed examples, the apparatus further includes a seal located between the structural battery and the wall. In some disclosed examples, the seal is located within the recess.

In some disclosed examples, an apparatus comprises a fuselage including a floor. In some disclosed examples, the floor has an upper surface, a lower surface, and a structural battery embedded in the floor between the upper surface and the lower surface.

In some disclosed examples, the floor separates a cabin area of the fuselage from a cargo area of the fuselage. In some disclosed examples, the structural battery is removably coupled to the floor. In some disclosed examples, the floor includes a recess to receive the structural battery.

In some disclosed examples, an apparatus comprises a fuselage including a wall. In some disclosed examples, the wall has an outer surface, an inner surface, and a battery embedded in the wall between the outer surface and the inner surface. In some disclosed examples, the battery includes a casing fabricated from carbon composite material. In some disclosed examples, the casing is to provide structural support to the wall.

In some disclosed examples, the wall separates an internal area of the fuselage from an external ambient environment. In some disclosed examples, the battery is removably coupled to the wall. In some disclosed examples, the wall includes a recess formed inwardly relative to the outer surface of the wall. In some disclosed examples, the recess is to receive the battery.

Although certain example methods, apparatus and articles of manufacture have been disclosed herein, the scope of coverage of this patent is not limited thereto. On the contrary, this patent broadly covers and encompasses all methods, apparatus and articles of manufacture fairly falling within the scope of the claims of this patent.

What is claimed is:

1. An apparatus, comprising:
   a fuselage including a wall, the wall having an outer surface and an inner surface located opposite the outer surface; and
   a structural battery embedded in the wall between the outer surface and the inner surface, the structural battery including a cylindrical casing having a first circular structural surface, a second circular structural surface located opposite the first circular structural surface, and a peripheral surface extending between the first circular structural surface and the second circular structural surface, the first circular structural surface oriented toward the outer surface, the second circular structural surface oriented toward the inner surface.

2. The apparatus of claim 1, wherein the wall separates an internal area of the fuselage from an external ambient environment.

3. The apparatus of claim 1, wherein the structural battery is removably coupled to the wall.

4. The apparatus of claim 1, wherein the structural battery includes electrodes to charge the structural battery, the electrodes being accessible via the first circular structural surface of the cylindrical casing.

5. The apparatus of claim 1, wherein the wall includes a cylindrical recess formed inwardly relative to the outer surface of the wall, the cylindrical recess configured to receive the second circular structural surface and the peripheral surface of the cylindrical casing.

6. The apparatus of claim 5, further comprising magnetic fasteners located in the cylindrical recess to removably couple the cylindrical casing to the wall.

7. The apparatus of claim 5, wherein the first circular structural surface of the cylindrical casing is flush with a surrounding portion of the outer surface of the wall when the cylindrical casing is received in the cylindrical recess.

8. The apparatus of claim 5, wherein the peripheral surface includes outwardly-extending threads arranged about a circumference of the peripheral surface, the outwardly-extending threads configured to removably threadedly couple the cylindrical casing of the structural battery to the cylindrical recess of the wall.

9. The apparatus of claim 5, further including a seal located between the peripheral surface of the cylindrical casing and the cylindrical recess of the wall.

10. An apparatus, comprising:
    a fuselage including a wall, the wall having an outer surface and an inner surface located opposite the outer surface; and
    a structural battery embedded in the wall between the outer surface and the inner surface, the structural battery including a cylindrical casing fabricated from carbon composite material, the cylindrical casing having a first circular structural surface, a second circular structural surface located opposite the first circular structural surface, and a peripheral surface extending between the first circular structural surface and the second circular structural surface, the first circular structural surface oriented toward the outer surface, the second circular structural surface oriented toward the inner surface.

11. The apparatus of claim 10, wherein the wall separates an internal area of the fuselage from an external ambient environment.

12. The apparatus of claim 10, wherein the structural battery is removably coupled to the wall.

13. The apparatus of claim 10, wherein the wall includes a cylindrical recess formed inwardly relative to the outer surface of the wall, the cylindrical recess configured to receive the second circular structural surface and the peripheral surface of the cylindrical casing.

14. The apparatus of claim 13, wherein the first circular structural surface of the cylindrical casing is flush with a surrounding portion of the outer surface of the wall when the cylindrical casing is received in the cylindrical recess.

15. The apparatus of claim 13, wherein the peripheral surface includes outwardly-extending threads arranged about a circumference of the peripheral surface, the outwardly-extending threads configured to removably threadedly couple the cylindrical casing of the structural battery to the cylindrical recess of the wall.

16. The apparatus of claim 15, further including a seal located between the peripheral surface of the cylindrical casing and the cylindrical recess of the wall.

17. An apparatus, comprising:
    a fuselage including a wall, the wall having an outer surface, an inner surface located opposite the outer surface, and a cylindrical recess formed inwardly relative to the outer surface, the wall separating an internal area of the fuselage from an external ambient environment; and
    a structural battery embedded in the wall between the outer surface and the inner surface, the structural battery including a cylindrical casing having a first circular structural surface, a second circular structural surface located opposite the first circular structural surface, and a peripheral surface extending between the first circular structural surface and the second circular structural surface, the first circular structural surface oriented toward the outer surface, the second circular structural surface oriented toward the inner surface, the peripheral surface including outwardly-extending threads arranged about a circumference of the peripheral surface, the outwardly-extending threads configured to removably threadedly couple the cylindrical casing of the structural battery to the cylindrical recess of the wall.

18. The apparatus of claim 17, wherein the cylindrical recess is configured to receive the second circular structural surface and the peripheral surface of the cylindrical casing.

19. The apparatus of claim 17, wherein the first circular structural surface of the cylindrical casing is flush with a surrounding portion of the outer surface of the wall when the cylindrical casing is received in the cylindrical recess.

20. The apparatus of claim 17, further including a seal located between the peripheral surface of the cylindrical casing and the cylindrical recess of the wall.

* * * * *